(12) United States Patent
Ahmed et al.

(10) Patent No.: US 11,848,140 B2
(45) Date of Patent: Dec. 19, 2023

(54) INTEGRATED PARALLEL MATRIX TRANSFORMER AND INDUCTOR

(71) Applicant: Virginia Tech Intellectual Properties, Inc., Blacksburg, VA (US)

(72) Inventors: Mohamed Hassan Abouelella Ahmed, Blacksburg, VA (US); Fred C. Lee, Blacksburg, VA (US); Qiang Li, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 289 days.

(21) Appl. No.: 16/899,053

(22) Filed: Jun. 11, 2020

(65) Prior Publication Data

US 2020/0395164 A1    Dec. 17, 2020

Related U.S. Application Data

(60) Provisional application No. 62/860,166, filed on Jun. 11, 2019.

(51) Int. Cl.
*H01F 27/26* (2006.01)
*H01F 27/28* (2006.01)

(52) U.S. Cl.
CPC ......... *H01F 27/26* (2013.01); *H01F 27/2804* (2013.01)

(58) Field of Classification Search
CPC ......... H01F 27/2804; H01F 2027/2809; H01F 2027/2819; H01F 27/24; H01F 27/306;

(Continued)

(56) References Cited

U.S. PATENT DOCUMENTS

| 6,867,678 B2 * | 3/2005 | Yang | H01F 27/2804 336/200 |
| 7,295,094 B2 * | 11/2007 | Jitaru | H01F 27/2804 336/200 |

(Continued)

OTHER PUBLICATIONS

S. Jiang, C. Nan, X. Li, C. Chung, and M. Yazdani, "Switched tank converters," in Conference Proceedings—IEEE Applied Power Electronics Conference and Exposition—APEC, Jun. 6, 2019; vol. 34, No. 6 March, pp. 5048-5062.

(Continued)

*Primary Examiner* — Wei (Victor) Y Chan
(74) *Attorney, Agent, or Firm* — Thomas | Horstemeyer, LLP

(57) ABSTRACT

Various examples of an integrated parallel matrix transformer and inductor are disclosed herein. In one aspect, the transformer includes a first magnetic core having a first set of pillars of a first transformer and a second set of pillars of a second transformer and a second magnetic core having a first and second inductor pillar. The first and second magnetic cores can be separate or integrated into one core. The transformer also includes a planar winding structure. The planar winding structure may include a primary winding and a plurality of secondary windings. The primary winding can be configured to equally divide a primary current. The primary winding can extend a number of turns to conduct half of the primary current around the first inductor pillar and the first set of pillars and to conduct half of the primary current around the second inductor pillar and the second set of pillars.

20 Claims, 17 Drawing Sheets

(58) Field of Classification Search
CPC .......... H01F 27/40; H01F 27/28; H01F 27/38; H01F 3/10
See application file for complete search history.

(56) References Cited

U.S. PATENT DOCUMENTS

| | | | |
|---|---|---|---|
| 8,929,106 B2 | 1/2015 | Reddy et al. | |
| 2006/0006975 A1* | 1/2006 | Jitaru | H01F 27/2804 336/212 |
| 2017/0054378 A1* | 2/2017 | Njiende T. | H01F 30/04 |
| 2018/0278174 A1* | 9/2018 | Chen | H01F 27/306 |

OTHER PUBLICATIONS

D. Reusch and F. C. Lee, "High frequency bus converter with low loss integrated matrix transformer," Conf. Proc.—IEEE Appl. Power Electron. Conf. Expo.—APEC, pp. 1392-1397, 2012.

M. H. Ahmed, C. Fei, F. C. Lee, and Q. Li, "48V Voltage Regulator Module with PCB Winding Matrix Transformer for Future Data Centers," IEEE Trans. Ind. Electron., vol. 64, No. 12, pp. 9302-9310; 2017.

SynQor, "SQ60120QZB40 Datasheet." [Online]. Jul. 30, 2015; Available: https://www.synqor.com/products/busqor/sq60120qzb40?lang=en-us.

L. Chen, H. Wu, P. Xu, H. Hu, and C. Wan, "A high step-down nonisolated bus converter with partial power conversion based on synchronous LLC resonant converter," Conf. Proc.—IEEE Appl. Power Electron. Conf. Expo.—APEC, vol. 2015—May, No. May, pp. 1950-1955, 2015.

John Glaser, Johan Strydom, and David Reusch, "High Power Fully Regulated Eighthbrick DC-DC Converter with GaN FETs," in PCIM Europe 2015, 2015, No. May, pp. 1-20.

Ge, "QBVE067A0B41-HZ Barracuda *Datasheet," Dec. 3, 2015.

Ge, "QBVE060A0S10R4 Barracuda Series; DC-DC Converter Power Modules"; Sep. 9, 2013.

C. Fei, F. C. Lee, and Q. Li, "Light load efficiency improvement for high frequency LLC converters with Simplified Optimal Trajectory Control (SOTC)," 2015 IEEE Energy Convers. Congr. Expo. ECCE 2015, No. 2, pp. 1653-1659, 2015.

D. Reusch and F. C. Lee, "High frequency bus converter with integrated matrix transformers for CPU and telecommunications applications," 2010 IEEE Energy Convers. Congr. Expo. ECCE 2010—Proc., pp. 2446-2450, 2010.

M. Mu and F. C. Lee, "Design and Optimization of a 380-12 v High-Frequency, High-Current LLC Converter with GaN Devices and Planar Matrix Transformers," IEEE J. Emerg. Sel. Top. Power Electron., vol. 4, No. 3, pp. 854-862, 2016.

D. Huang, S. Ji, and F. C. Lee, "LLC resonant converter with matrix transformer," IEEE Transactions on Power Ectronics, vol. 29, No. 8, pp. 4339-4347, 2014.

C. Fei, F. C. Lee, and Q. Li, "High-efficiency High-power-density LLC Converter with an Integrated Planar Matrix Transformer for High Output Current Applications," IEEE Transactions on Industrial Electronics, vol. 64, No. 11, Nov. 2017.

* cited by examiner

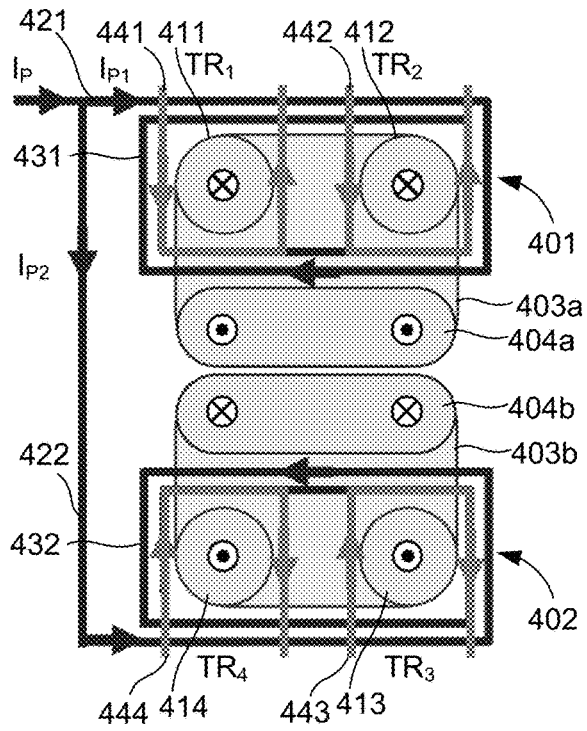
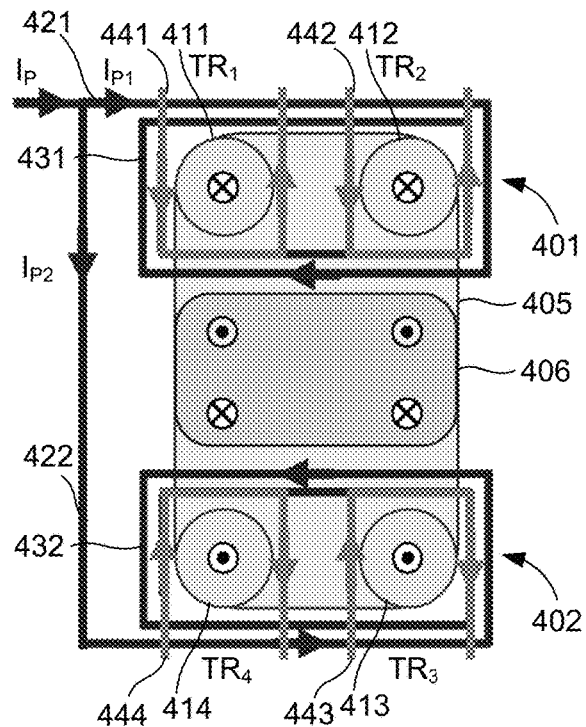
FIG. 4A
FIG. 4B
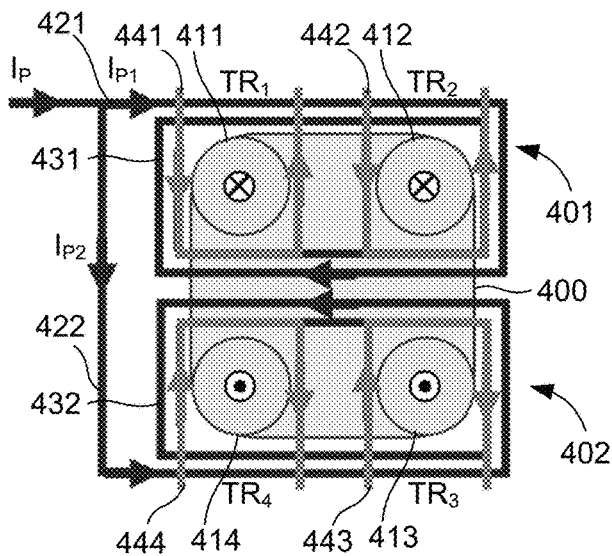
FIG. 4C

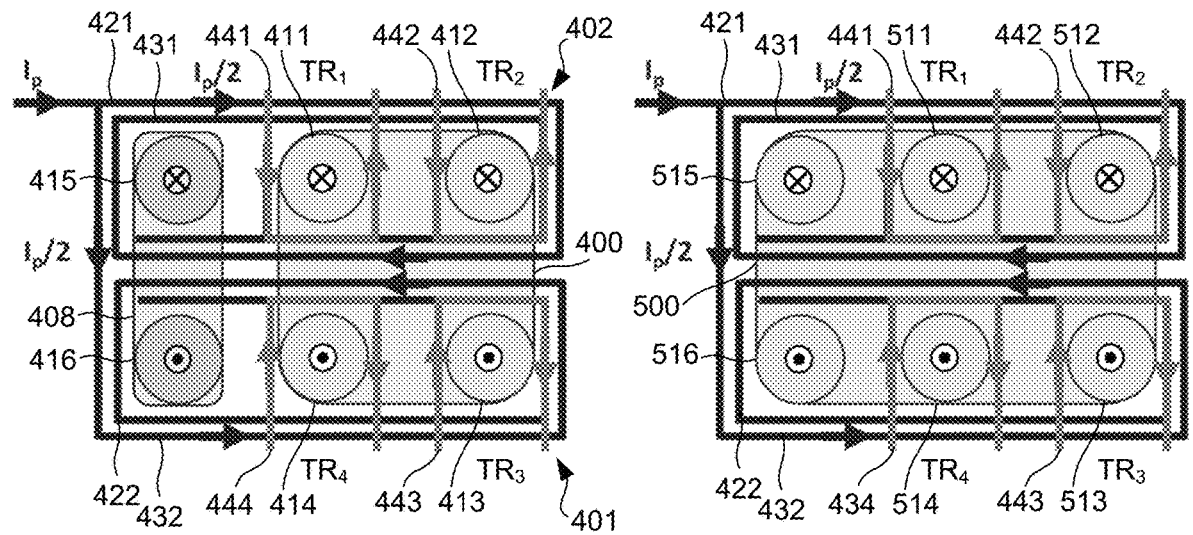
FIG. 5A  FIG. 5B
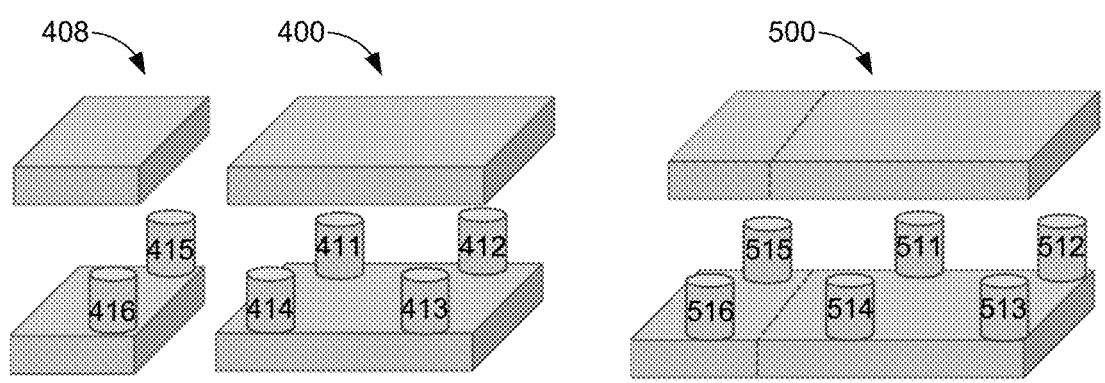
FIG. 6A  FIG. 6B

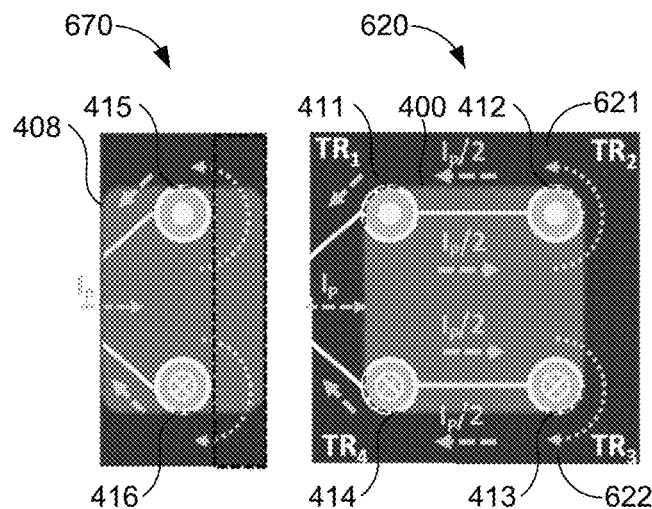 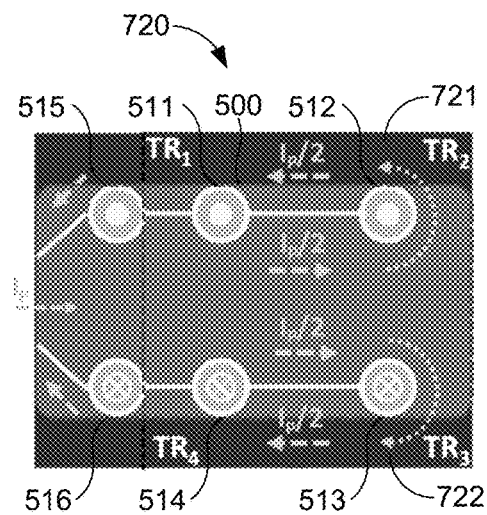
FIG. 7A  FIG. 7B
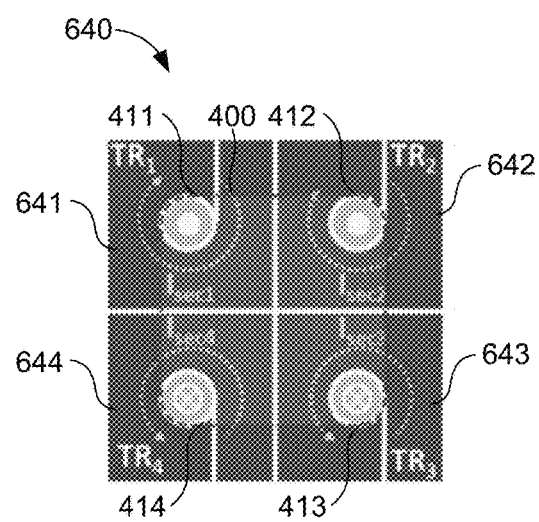
FIG. 8

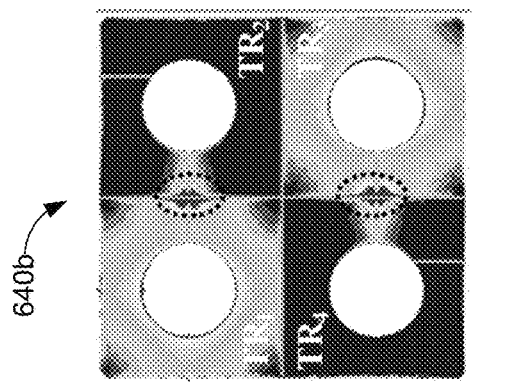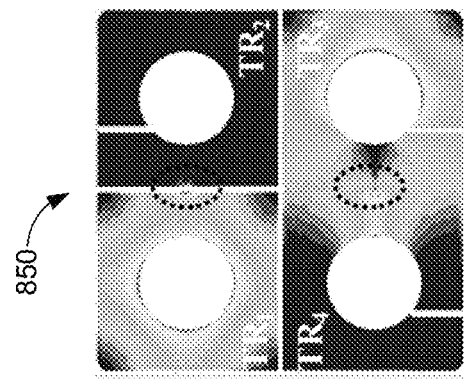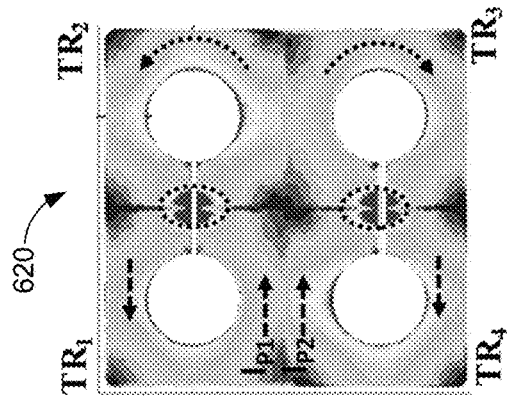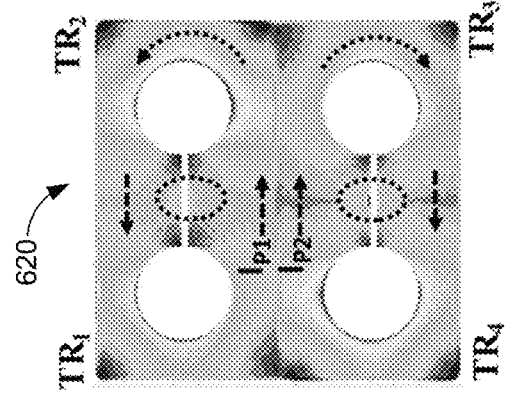
FIG. 9A    FIG. 9B
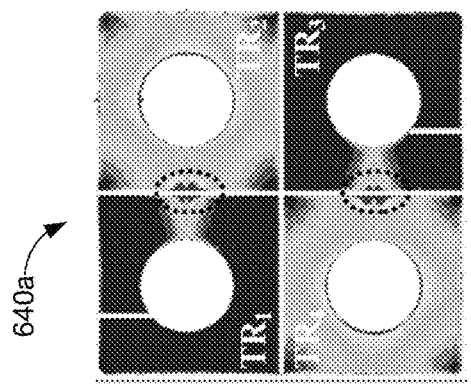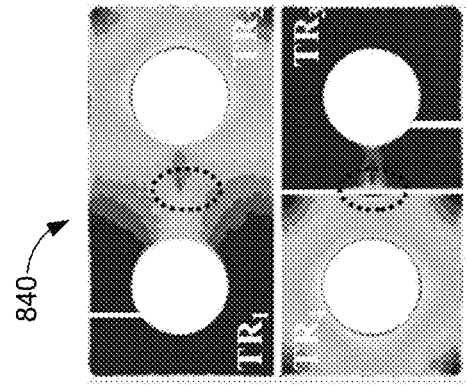

INTEGRATED PARALLEL MATRIX TRANSFORMER AND INDUCTOR

CROSS-REFERENCE TO RELATED APPLICATION

This application claims the benefit of and priority to U.S. Provisional Application No. 62/860,166, titled "INTEGRATED PARALLEL MATRIX TRANSFORMER AND INDUCTOR," filed on Jun. 11, 2019, the contents of which are hereby incorporated herein by reference in its entirely.

BACKGROUND

Power conversion is related to the conversion of electric power or energy from one form to another. Power conversion can involve converting between alternating current (AC) and direct current (DC) forms of energy, AC to AC forms, DC to DC forms, changing the voltage, current, or frequency of energy, or changing some other aspect of energy from one form to another. In that context, a power converter is an electrical or electro-mechanical device for converting electrical energy. A transformer is one example of a power converter, although more complicated systems, including complex arrangements of diodes, synchronous rectifiers, switching transistors, transformers, and control loops, can be used.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

FIGS. 4A-4C illustrate examples of a parallel matrix transformer with separate cores (FIG. 4A), with a single core (FIG. 4B), and with a single core reduced by flux cancellation (FIG. 4C) according to various embodiments described herein.

FIGS. 5A and 5B illustrate an example of an integrated inductor with transformer using separate cores (FIG. 5A) and with a single core (FIG. 5B) according to various embodiments described herein.

FIGS. 6A and 6B illustrate an example of a magnetic core structure using separate inductor and transformer cores (FIG. 6A) and with a single integrated inductor and transformer core (FIG. 6B) according to various embodiments described herein.

FIGS. 7A and 7B illustrate examples of a primary winding structure PCB arrangement for the transformer and inductor using separate PCB winding structures (FIG. 7A) and a primary winding structure PCB arrangement for the transformer and inductor sharing the same PCB winding for the transformer and inductor (FIG. 7B) according to various embodiments described herein.

FIG. 8 illustrates an example of a secondary winding structure PCB arrangement according to various embodiments described herein.

FIGS. 9A and 9B illustrate an example finite element analysis (FEA) simulations results according to various embodiments described herein.

DETAILED DESCRIPTION

As noted above, power conversion is related to the conversion of electric power or energy from one form to another. Power conversion can involve converting between alternating current (AC) and direct current (DC) forms of energy, AC to AC forms, DC to DC forms, changing the voltage, current, or frequency of energy, or changing some other aspect of energy from one form to another. In that context, a power converter is an electrical or electro-mechanical device for converting electrical energy. A transformer is one example of a power converter, although more complicated systems, including complex arrangements of diodes, synchronous rectifiers, switching transistors, transformers, and control loops, can be used.

In the context of power converters, various examples of power converters with an integrated parallel matrix transformer and inductor are described herein. In one example, two parallel matrix transformers can be integrated into one core by employing flux cancellation. The winding structure is described herein. Transformer primary side printed circuit board (PCB) windings can also be utilized to implement an inductor that can either share the same core with the transformer or use a separate core. The primary windings are arranged in a manner to fully utilize the copper in the PCB, with a symmetrical structure to avoid current sharing problems among parallel transformers. An overlapped secondary side windings structure is proposed to minimize the AC winding resistance of the transformer. Parallel synchronous rectifiers (SR) and output capacitors are placed on separate layers of the PCB to be as close as possible to the transformer windings. In one example, an LLC resonant converter incorporates the integrated parallel matrix transformer and inductor design, although the design can be implemented and relied upon in other types and configurations of power converters.

In the context of power converters, isolated DC/DC converters are widely used in information technology applications. In a DC/DC converter, the transformer and inductor design is critical to the overall efficiency. For high-step-down applications that require low-voltage, high-current outputs, such as computer servers, the high output current is very difficult to handle due to large conduction losses.

Figure 1:
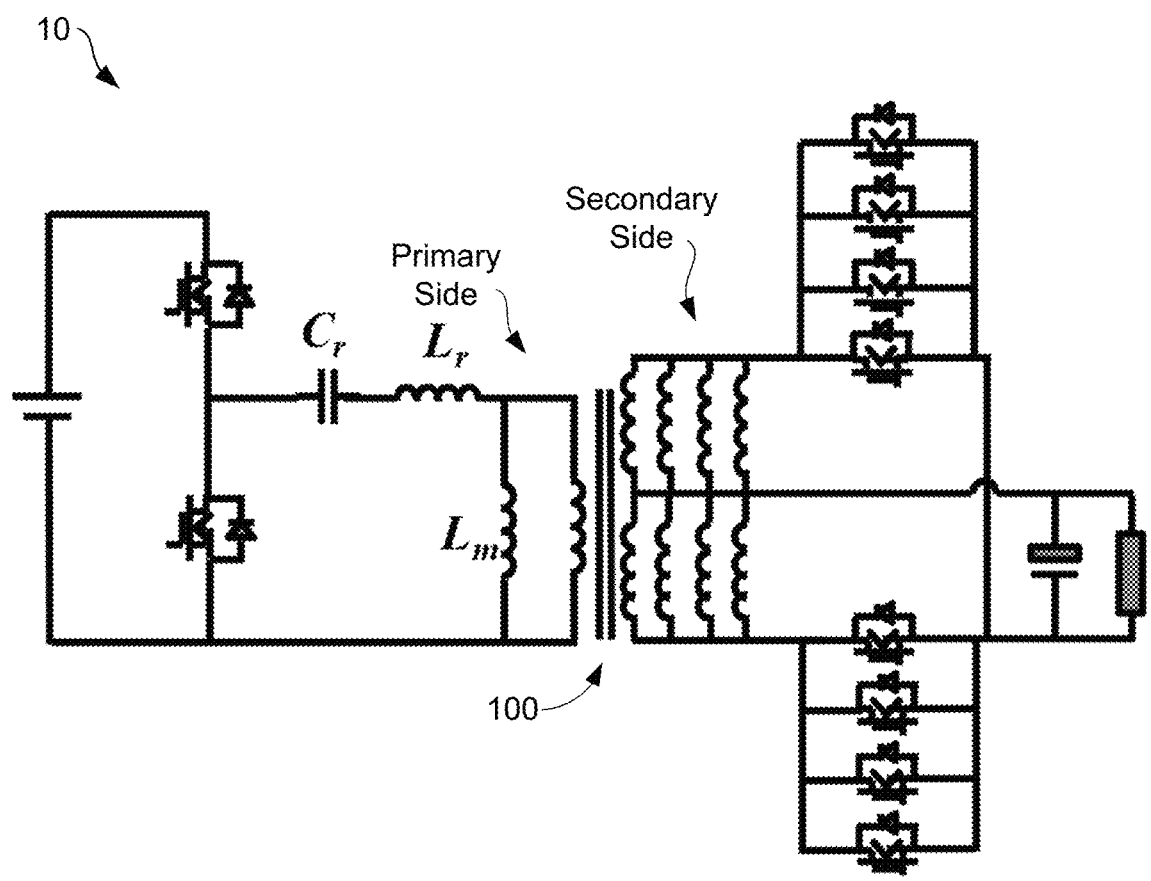
FIG. 1 illustrates an example of a resonant power converter according to various embodiments described herein.

FIG. 1 illustrates an example of a resonant power converter 10 according to various embodiments described herein. As shown, the resonant power converter 10 includes a single transformer 100 with parallel synchronous rectifiers (SRs) on the secondary side. In this example, the secondary windings and the SRs are both connected in parallel to reduce conduction loss. However, this design results in several important design considerations. First, when connecting a large number of SRs in parallel, both static and dynamic current sharing are difficult to achieve. Second, a large sum of high frequency and high di/dt AC currents must flow through a common termination point between the transformer and the SRs, which can result in large termination losses. Third, large leakage inductances at the transformer secondary-side windings result in large winding losses. To improve on these limitations, a matrix transformer structure can address the challenges and drawbacks of the conventional design.

For example, the transformer 100 of the resonant power converter 10 shown in FIG. 1 can be replaced or reconfigured with a number of elemental transformers. The elemental transformers are scalable corresponding to the configuration of the single transformer 100. For example, a traditional single core structure can be divided into a 2-core structure, with the primary windings in series and the secondary windings in parallel. Since the primary current for the elemental transformers are the same, the secondary current for the elemental transformers can be balanced. There is also no (or less) termination loss, because the termination point, where all currents are summed, exists on the DC side. Transformer winding losses are significantly reduced as are the leakage inductances in this arrangement.

In the example of the 2-core structure, two sets of EI-shaped magnetic cores can be used for each transformer and can be assembled with a PCB winding to achieve the 2-core structure. Further, the two transformers can be integrated into a one-core UI-shape magnetic core structure by means of flux cancellation, thus, resulting in reduced core volume and core loss. The concept of integrating multiple transformers into a one-core structure can be further extended to integrate four transformers into a one-core structure by flux cancellation.

Figure 2:
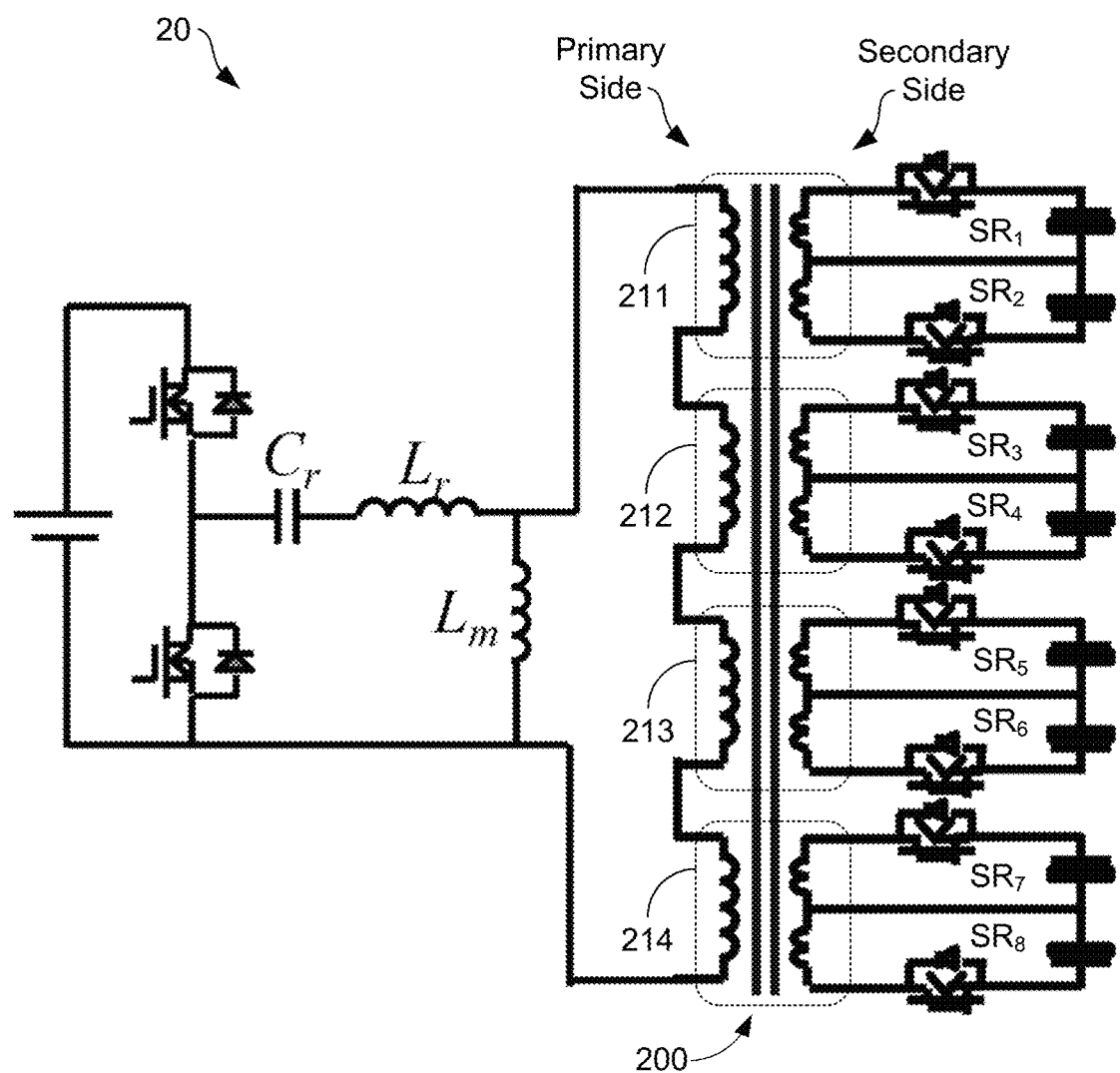
FIG. 2 illustrates an example of a resonant power converter including elemental transformers according to various embodiments described herein.

FIG. 2 illustrates an example of a resonant power converter 20 including elemental transformers according to various embodiments described herein. As shown in FIG. 2, an example of a resonant power converter 20 can include a matrix transformer 200. The primary side of the power converter 20 includes a full bridge configuration of switching transistors. As shown in FIG. 2, the matrix transformer 200 includes elemental transformers 211-214. The primary side winding of each elemental transformer 211-214 is arranged in series. The secondary side winding of each elemental transformer 211-214 is divided or separated into two parts by a center tap, and each part includes a series-connected SR and capacitor. In operation, a first secondary winding of each elemental transformer 211-214 conducts during a first-half cycle, and a second secondary winding of each elemental transformer 211-214 conducts during a second-half cycle. Each of the elemental transformers 211-214 includes a number of primary windings and a number of secondary windings, to provide a specified turns ratio.

While the example in FIG. 2 illustrates four elemental transformers, each with a center-tap secondary winding, secondary windings without center taps can also be used. With the flux cancellation method described herein, the core volume and losses can be reduced significantly to a 4 pillar UI-core shape. According to one aspect of the embodiments, the elemental transformers 211-214 can be implemented as four transformers integrated into a single four pillar magnetic core, each with primary and secondary windings. The single core structure integrated with four transformers is suitable for high-step-down ratio and high-output current applications. However, the single core structure integrated with four transformers still has some drawbacks.

For high output currents and medium step down ratio applications, multiple transformer secondaries need to be connected in parallel with a low total turns ratio of the transformer. An EI-shape structure is suitable for low turns ratio applications but is only a two transformer structure, limiting its capability of handling higher currents. The single core structure integrated with four transformers has more transformer secondaries, but has some limitations when implemented for low turns ratio applications with PCB windings. Both structures rely on the transformer leakage inductance to serve as the DC/DC converter inductor. This inductance normally has a small value and cannot be controlled precisely. These structures cannot be used to achieve high inductance values that can be controlled precisely, which is required by some DC/DC converters.

In the context outlined above, various examples of an integrated parallel matrix transformer and inductor structure are described herein. The integrated parallel matrix transformer and inductor structure is suitable for low turns ratio and high output current DC/DC converters, among other types of converters. For example, two parallel matrix transformers can be integrated into one core by employing flux cancellation. The transformer primary side PCB windings also can be utilized to implement an inductor that can either share the same core with the transformer or use a separate core. The primary windings can be arranged in a manner to fully utilize the copper in the PCB with a symmetrical structure to avoid current sharing problems among parallel transformers. An overlapped secondary side winding structure can also be used to minimize the AC winding resistance of the transformer. Parallel SRs and output capacitors can be placed on separate layers close to the transformer windings. Although other topologies can be considered, the integrated parallel matrix transformer and inductor described herein has been incorporated into an LLC resonant converter, as an example to describe the transformer design. The integrated parallel matrix transformer and inductor is also applicable to other DC/DC converters and can be implemented and relied upon in other types and configurations of power converters.

Figure 3:
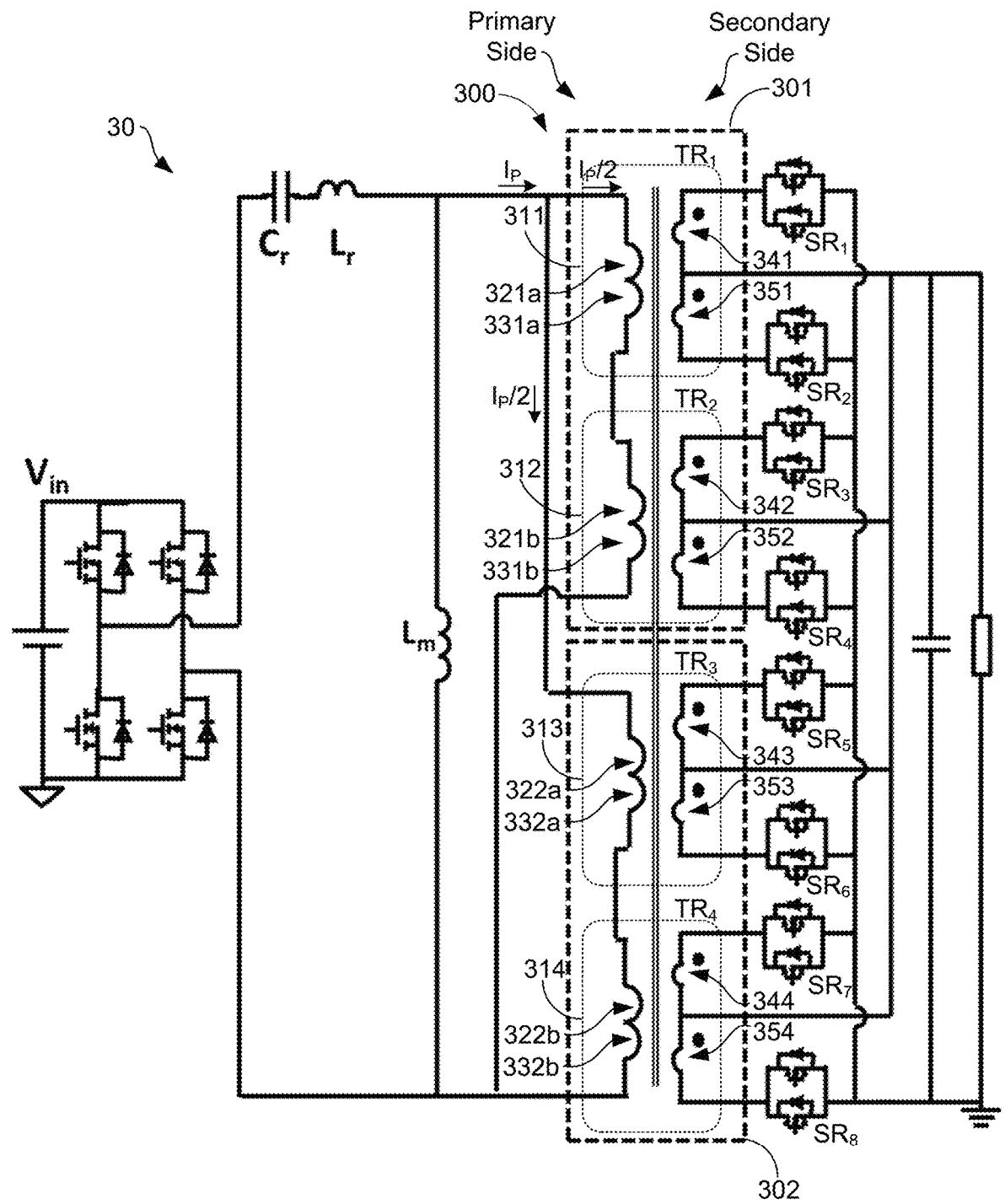
FIG. 3 illustrates an example of a resonant power converter with a parallel matrix transformer structure according to various embodiments described herein.

FIG. 3 illustrates an example of a resonant power converter 30 with a parallel matrix transformer structure according to various embodiments described herein. As shown in FIG. 3, the matrix transformer 200 shown in FIG. 2 can be replaced with the transformer 300 for the power converter 30. In this example, the transformer 300 includes a first matrix transformer 301 and a second matrix transformer 302, arranged in parallel. The first matrix transformer 301 includes elemental transformers 311 and 312. The second matrix transformer 302 includes elemental transformers 313 and 314. The primary side winding of the first matrix transformer 301 is arranged in series for elemental transformers 311 and 312. The primary side winding of the second matrix transformer 302 is arranged in series for elemental transformers 313 and 314. As such, the primary current $I_P$ is divided equally between the first and second matrix transformers 301, 302, where $I_{P1}=I_P/2$ conducts over the primary winding of the first matrix transformer 301 and $I_{P2}=I_P/2$ conducts over the primary winding of the second matrix transformer 302. The secondary side winding of each elemental transformer 311-314 is divided or separated into two parts by a center tap, which each part including two SRs are connected in series according to the example. In this example, the SRs are in parallel on each side of each center tap elemental transformer. In operation, a first secondary winding of each elemental transformer 311-314 conducts during a first-half cycle, and a second secondary winding of each elemental transformer 311-314 conducts during a second-half cycle.

In this example, there is a 2:1:1 turns ratio for each elemental transformer. As such, there is a first primary turn and second primary turn for each elemental transformer. For example, in the first matrix transformer 301, the primary winding includes the first primary turn 321a, 321b in elemental transformers 311, 312 and the second primary turn 331a, 331b in elemental transformers 311, 312. Each elemental transformer 311, 312 includes a first secondary turn 341, 342, which conducts during the first half cycle, and a second secondary turn 351, 352, which conducts during the second half cycle. Similarly, in the second matrix transformer 302, the primary winding includes the first primary turn 322a, 322b in elemental transformers 313, 314, and the second primary turn 332a, 332b in elemental transformers 313, 314. Each elemental transformer 313, 314 of the second matrix transformer 302 includes a first secondary turn 343, 344, which conducts during the first half cycle, and a second secondary turn 353, 354, which conducts during the second half cycle.

In the examples described below, the parallel matrix transformers 301, 302 can be integrated into one core structure. In addition, the primary windings of the transformer can be utilized to create a controlled value inductance required by the DC/DC converters. The related winding structure can fully utilize the copper in each PCB layer.

FIG. 4A illustrates the two separate core structures 403a and 403b (collectively "403") for a first matrix transformer 401 and a second matrix transformer 402 with the primary and secondary windings. In this example, each matrix transformer 401, 402 corresponds to the first and second matrix transformers 301, 302 shown schematically in FIG. 3. The magnetic core 403 includes 3 pillars. For example, for the first matrix transformer 401, magnetic core 403a has a first and second pillar 411, 412 used for the first and second elemental transformers $TR_1$ and $TR_2$, respectively, and a third elongated pillar 404a. Similarly, in the second matrix transformer 402, the magnetic core 403b has a first and second pillar 413, 414 used for the third and fourth elemental transformers $TR_3$ and $TR_4$, and a third elongated pillar 404b. Shown in FIG. 4A, the third pillar 404a, 404b of each magnetic core 403a, 403b are positioned to abut each other in the middle.

As illustrated in FIG. 4A, the windings corresponding to the primary and secondary windings of the schematic of FIG. 3 with a 2:1:1 turns ratio. In this example, the windings for the first half-cycle are shown. For example, the magnetic core 403a of the first matrix transformer 401 has primary winding 421, 431 conducting current around pillars 411, 412, and secondary windings 441, 442 around pillars 411, 412, respectively. As illustrated, in each of the pillars an "X" designates flux into the page, and a filled circle designates flux out of the page. The current $I_P$ is divided equally between the parallel matrix transformers 401, 402, such that $I_{P1}=I_P/2$ for the first matrix transformer 401 and $I_{P2}=I_P/2$ for the second matrix transformer 402. As shown in FIG. 4A, the current direction for the second matrix transformer 402 can be reversed such that the flux of the middle elongated third pillar 404b is opposite of the middle elongated third pillar 404a of first matrix transformer 401.

As shown in FIG. 4B, the separate magnetic cores 403a and 403b can be replaced with a single magnetic core 405 for the first and second matrix transformers 401, 402. The middle elongated third pillars 404a, 404b of FIG. 4A can be combined to a single common pillar 406 forming a single structure magnetic core 405. The single magnetic core 405 has four transformer pillars 411-414 and the middle common pillar 406. The pillars 411-414 correspond to individual elemental transformers $TR_1$-$TR_4$ and are positioned on the single magnetic core 405 similar to as the position of pillars 411-414 on the separate cores 403a, 403b in FIG. 4A. The primary and secondary windings remain the same as in FIG. 4A. With reversing the current direction of the elemental transformers $TR_3$ and $TR_4$, the flux in the middle common pillar 406 from these two transformers is in an opposite direction of the flux from the elemental transformers $TR_1$ and $TR_2$. Since all the flux is cancelled in the common pillar 406 of magnetic core 405, the common pillar 406 can be removed saving core volume and losses.

FIG. 4C illustrates a magnetic core structure 400 with flux cancellation. The core size is reduced from FIG. 4B, by removing the common pillar 406. In this example, a single core 400 is shown with four pillars 411-414 as elemental transformers. The same primary and secondary windings have been maintained from FIG. 4B to form two matrix transformers 401, 402 in parallel in a single core 400, each with a 2×2:1 turns ratio. The primary current $I_P$ is divided equally between the parallel matrix transformers 401, 402, such that $I_{P1}=I_P/2$ for the first matrix transformer 401 and $I_{P2}=I_P/2$ for the second matrix transformer 402. Primary windings 421, 431 conduct current around pillars 411 and 412 of the first matrix transformer 401. Primary windings 422, 432 conduct current around pillars 413 and 414 of the second matrix transformer 402. As illustrated, in each of the pillars an "X" designates flux into the page, and a filled circle designates flux out of the page.

To integrate an inductor in the same magnetic structure, a UI core structure 408 can be added adjacent to magnetic core 400, as shown in FIG. 5A. In this example, the core 408 include two pillars 415 and 416, positioned next to pillars 411 and 414, respectively. An inductor is created by extending only the primary windings 421, 422 and 431,432 of FIG. 4C to include the two pillars 415 and 416 of the core structure 408. As shown in FIG. 5A, the inductor can have a separate magnetic core 408 and share the same primary winding with the transformer core 400.

In another example, the separate cores 400 and 408 can be combined to a single core 500 with six pillars as illustrated in FIG. 5B. As shown, the single core 500 has four transformer pillars 511-514 and two inductor pillars 515 and 516. The primary windings 421, 422 and 431, 432 of FIG. 5A are maintained and the secondary windings 441-444 correspond to transformers $TR_1$-$TR_4$, accordingly. The integrated structure 500 saves the total winding length of the primary side winding compared to the separate inductor core 408 and transformer core 400 of FIG. 5A. The reduction in winding length can reflect as a reduction in the total primary winding resistance.

Shown in FIG. 6A is the magnetic core structures for the separate inductor core 408 and transformer core 400, as described with respect to FIG. 5A. The transformer core 400 having pillars 411-414 and the inductor core 408 having pillars 415, 416. In FIG. 6B, the magnetic core structure for the single magnetic core 500, including both a transformer portion with transformer pillars 511-514 and an inductor portion with inductor pillars 515, 516 is shown as described with respect to FIG. 5B. The integrated parallel matrix transformer and inductor can be implemented with either the separate core structure 400, 408 or the single core 500. Although the examples shown include four elemental transformers configured as two matrix transformers in one core, the integrated parallel matrix transformer and the inductor can be implemented and relied upon in other types and configurations of power converters. The related winding structure shown in FIGS. 5A and 5B can be implemented in a planar wiring structure to fully utilize the copper in each PCB layer, as will be described further herein.

FIG. 7A illustrates an example of a primary winding structure PCB arrangement for the transformer and inductor using separate PCB winding structures 620 and 670 according to various embodiments described herein. Shown in FIG. 7A is an example primary winding structure of a PCB layer for planar wiring structure for the integrated parallel matrix transformer and inductor, shown in two portions 620 and 670 corresponding to the separate transformer core 400 and inductor core 408 having separate winding and core structures for the transformer and inductor. In this example, a primary winding layer comprising two adjacent PCB windings 620 and 670 is shown as a top view implemented respectively with transformer core 400 and inductor core 408 illustrated in FIG. 6A. The primary current $I_P$ is conducted over the central portion of PCB 670 to the central portion of PCB 620. The PCB windings 621 on PCB 620 conducts the half of the current ($I_P/2$) around transformer pillars 411, 412 ($TR_1$ and $TR_2$) and the other half of the current ($I_P/2$) around transformer pillars 413, 414 ($TR_3$ and $TR_4$). As illustrated, in each of the pillars an "X" designates flux into the page, and a filled circle designates flux out of the page.

FIG. 7B illustrates an example of a primary winding structure PCB arrangement 720 for the transformer and inductor sharing the same PCB winding for the transformer and inductor according to various embodiments described herein. This primary winding structure 720 can be used with either the separate transformer and inductor cores 400 and 408 (FIG. 6A) or the single transformer and inductor core 500 (FIG. 6B). Shown in FIG. 7B, an example primary winding structure 720 of a PCB layer for planar wiring structure for the integrated parallel matrix transformer and inductor, shown corresponding to the single integrated transformer and inductor core 500. For the winding structure 720 of FIG. 7B, the transformer and inductor share the same PCB winding, which can reduce the footprint highlighted inside the dashed box on the right side of PCB 670 in FIG. 7A. The resulting integrated PCB 720 is shown in FIG. 7B and the winding loss can be reduced by 25%. In this example, a primary winding layer 720 shown as a top view implemented with the single integrated core 500 illustrated in FIG. 6B. The primary current $I_P$ is conducted over the central portion of PCB 720. The PCB windings 721 on PCB 720 conducts half of the current ($I_P/2$) around transformer pillars 511, 512 ($TR_1$ and $TR_2$) and inductor pillar ($L_1$) 515 and the other half of the current ($I_P/2$) around transformer pillars 513, 514 ($TR_3$ and $TR_4$) and inductor pillar 516 ($L_2$). In comparison with FIG. 7A, due to utilizing the same primary winding between both components, the area highlighted in the dashed black box on 670 can be removed and combined with 620, resulting in the integrated PCB 720 as shown in FIG. 7B. The total footprint of the structure can be reduced by 10% and the winding loss can be reduced by 25%. Although not illustrated in FIG. 7B, winding structure 720 can also be used with the separate core structure 400 and 408 arranged next to each other, such that pillars 411-414 of the transformer core 400 and pillars 415-416 of the inductor core 408 correspond to pillars 511-516 of core 500 as shown.

FIG. 8 illustrates an example of a secondary winding structure PCB 640 which can be implemented with either magnetic core 400 or magnetic core 500 (not shown). In the example shown with a magnetic core 400, the PCB 640 provides secondary windings 641-644 around pillars 411-414, respectively. Since the inductor portion of the integrated parallel matrix transformer and inductor is created by extending only the primary windings, a second PCB for inductor core 408 is not required. In another example, when implemented with magnetic core 500 (FIG. 6B), the PCB 640 provides secondary windings 641-644 around pillars 511-514, respectively. Since the inductor portion of the integrated parallel matrix transformer and inductor is created by extending only the primary windings, PCB 640 is used only with the transformer portion of the core 500 and no windings are necessary for pillars 515 and 516.

Shown in FIG. 9A are finite element analysis (FEA) simulations results for the flux distribution when implementing primary winding 620 and secondary winding 640. As shown in this example, the flux distribution is indicated in grayscale indicating current flow with dark shading indicating low or no current flow. Primary winding 620 is shown in the center, with the current direction indicated. Secondary winding 640 can be implemented for both the first secondary winding 640a and the second secondary winding 640b. The secondary winding 640a is shown on the left for the first half cycle and the secondary winding 640b shown on the right for the second half cycle. As shown, the flux is low around $TR_1$ and $TR_3$ in the first half cycle and low around $TR_2$ and $TR_4$ in the second half cycle. The portion indicated by the dashed oval, between $TR_1$ and $TR_2$ and between $TR_3$ and $TR_4$, indicate current crowding.

Figure 10A:
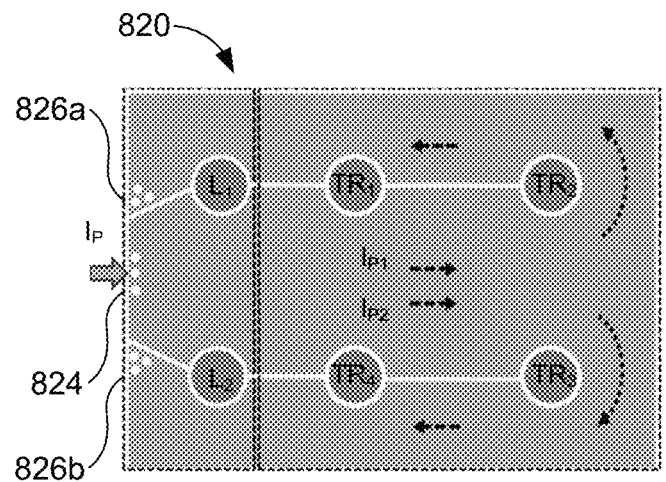
FIGS. 10A-E illustrate examples of detailed winding arrangements of PCB layers of the winding structure according to various embodiments described herein.
Figure 10B:
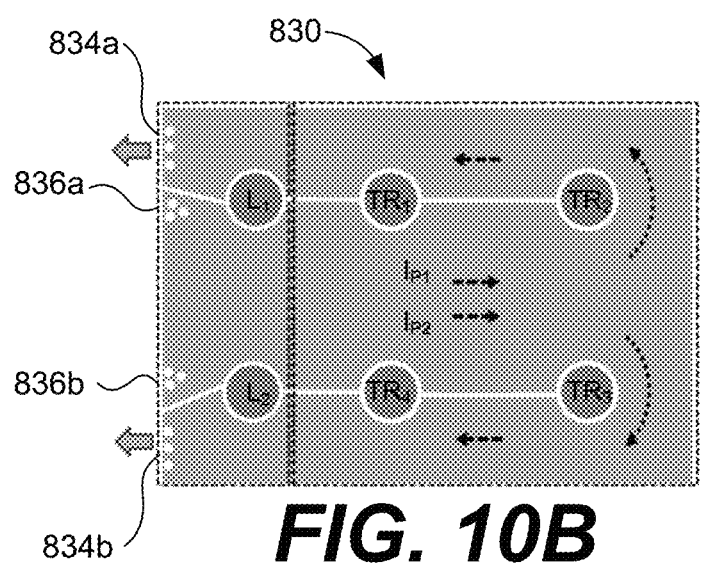
Figure 10C:
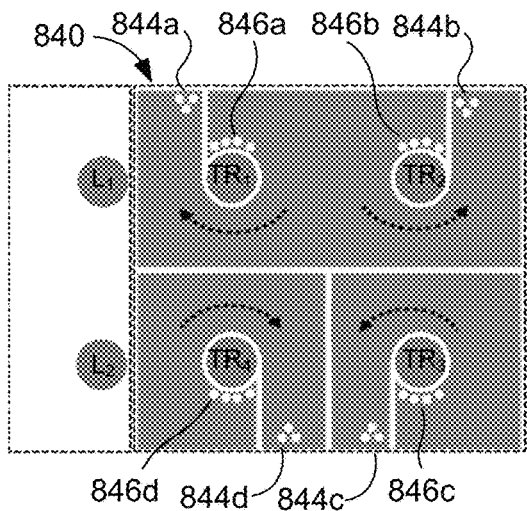
Figure 10D:
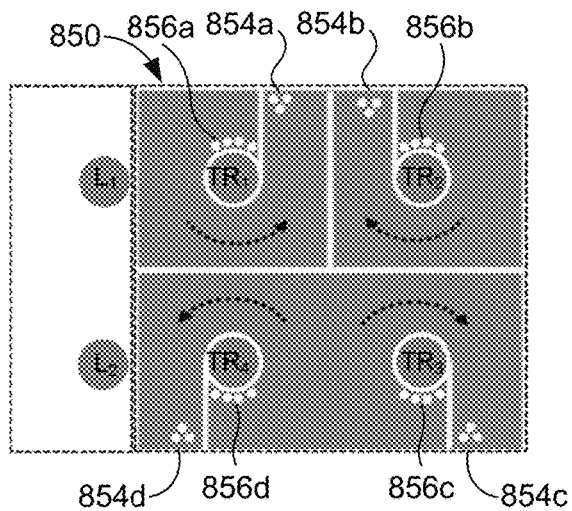

In order to control the leakage flux, the secondary winding PCB 640 can be modified to remove the gap between $TR_1$ and $TR_2$ for a first secondary winding 840 (FIG. 10C) and to remove the gap between $TR_3$ and $TR_4$ for a second secondary winding 850 (FIG. 10D). The resulting flux distribution is shown in FIG. 9B. The reduction in current crowding in some areas of the windings due to the overlapped winding structure in the secondary windings will result in about 25% winding loss reduction.

Various examples of winding structures utilized with an integrated parallel matrix transformer and inductor structure can be described in greater detail. FIGS. 10A-E illustrate examples of detailed winding arrangements of PCB layers of the winding structure. For example, an 8-layer PCB can be used to implement the windings of the integrated parallel matrix transformer and inductor structure with two matrix transformers with a 2×2:1 turns ratio each. Using the integrated core 500, shown in FIG. 6B, a planar winding structure would include a PCB for each of the first and second primary windings 820, 830 (FIGS. 10A-E) and a secondary winding for the first half cycle 840 and a secondary winding for the second half cycle 850. Additionally, two termination layers 860 can be included to locate the SRs close to the windings. Although an 8-layer PCB can be used to explain how the winding structure is arranged, the winding structure can also be implemented by multiple-layer PCB other than 8-layer PCB. When multiple-layer PCB is employed, the interleaving structure may also be changed accordingly other than the structure used in 8-layer PCB.

FIG. 10A illustrates a first primary winding (Pri1) layer 820. Similar to the PCB 720 shown in FIG. 7B, the primary winding Pri1 layer 820 is utilized by both the transformer and the inductor. The primary input terminal 824 conducts the primary current $I_P$. The current is divided equally for the symmetrical primary windings such that $I_{P1}=I_P/2$ conducted around the first set of transformers $TR_1$ and $TR_2$ and $I_{P2}=I_P/2$ conducted around the second set of transformers $TR_3$ and $TR_4$. The current flows past the inductor pillars $L_1$ and $L_2$ to the vias 826*a*, 826*b* to connect the first primary winding Pri1 layer 820 to a second primary winding (Pri2) layer 830.

FIG. 10B illustrates a second primary winding Pri2 layer 830 similar to the Pri1 layer 820 in FIG. 10A. The input current is received from Pri1 layer 820 through the vias 836*a*,836*b*. The symmetrical primary windings conduct current $IP_1$ and $IP_2$. Primary output terminals 834*a*, 834*b* are used as an exit of the primary current of both the transformer and the inductor. In this example, an integrated parallel matrix transformer and inductor with a 2×2:1 turns ratio is shown, thus two primary layers 820, 830 are needed. The winding structure can be scaled to accommodate other configurations and turns ratios.

FIGS. 10C and 10D illustrate the secondary windings for the first half cycle (Sec1) layer 840 (FIG. 10C) and the second half cycle (Sec2) layer 850 (FIG. 10D). Both of Sec1 layer 840 and Sec2 layer 850 are configured to provide secondary windings only in the transformer portion of the integrated parallel matrix transformer and inductor, since only the primary windings are extended to create the inductor. Vias 844*a-d* on Sec1 layer 840 and vias 854*a-d* on Sec2 layer 850 are placed to connect with the termination layer 860 (FIG. 10E) and other secondary layers. Additionally, terminals 846*a-d* on Sec1 layer 840 and 856*a-d* on Sec2 layer 850 provide connection to the termination layer 860. As previously discussed with respect to the FEA simulations in FIGS. 9A and 9B, to reduce current crowding the gap between the adjacent secondary windings of $TR_1$ and $TR_2$ is closed on Sec1 layer 840 for the first half cycle and similarly there is no gap between the adjacent secondary windings of $TR_3$ and $TR_4$ in Sec2 layer 850 for the second half cycle. Overlapping the two secondary windings will result in reduction of the AC winding resistance. For each primary layer in the winding structure, there are corresponding secondary layers for the first and second half cycle. In this example, an integrated parallel matrix transformer and inductor with a 2×2:1 turns ratio is shown, thus two primary layers 820, 830 are used. Accordingly, Sec1 layer 840 and Sec2 layer 850 are placed for each primary layer 820, 830. For example, Sec1 layer 840*a* and Sec2 layer 850*a* can be arranged with Pri1 820 and Sec1 layer 840*b* and Sec2 layer 850*b* can be arranged with Pri2 830. Similarly, if additional primary layers are needed, secondary layers Sec1 layer 840 and Sec2 layer 850 would be added for each additional primary layer. The planar winding structure can be scaled to accommodate other configurations and turns ratios.

Figure 10E:
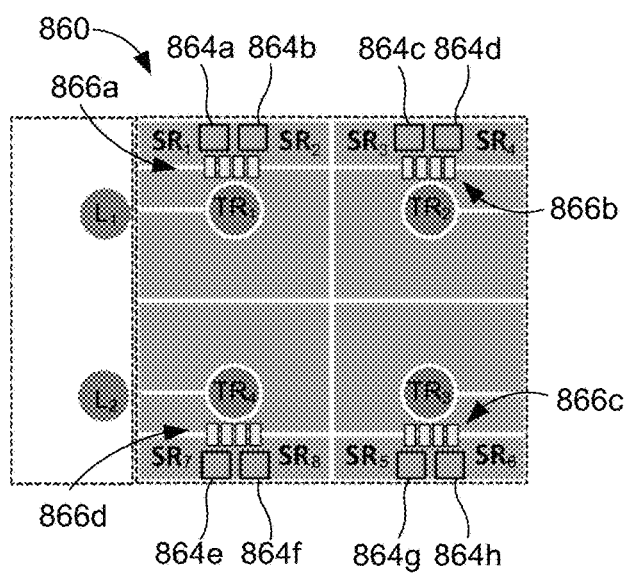

FIG. 10E illustrates a termination layer 860 having components windings for placement of the synchronous rectifiers (SR) 864*a-h* and output capacitors 866*a-d* very close to the windings to reduce termination losses. The termination layer is in communication with the secondary winding layers connected by vias 844*a-d* on Sec1 layer 840 and vias 854*a-d* on Sec2 layer 850. Two termination layers 860*a*, 860*b* are used in the planar winding structure positioned at the top and the bottom.

For example, a winding structure for an integrated parallel matrix transformer and inductor with a 2×2:1 turns ratio would include an 8-layer PCB. Layers 1 and 8 are the termination layers 860*a*, 860*b*. Layer 3 is the first primary windings layer Pri1 820. Layer 6 is the second primary windings layer Pri2 830. Placed above each primary layer are the secondary windings for the first half cycle, 840*a* at layer 2 and 840*b* at layer 5. Placed below each primary layer are the secondary windings for the first half cycle, 850*a* at layer 4 and 850*b* at layer 7. As previously noted, the planar winding structure for the integrated parallel matrix transformer and inductor can have multiple primary and secondary layers and can be used to accommodate other configurations and turns ratios, however, two termination layers 860*a*, 860*b* can be used to accommodate other configurations and turns ratios.

Figure 11:
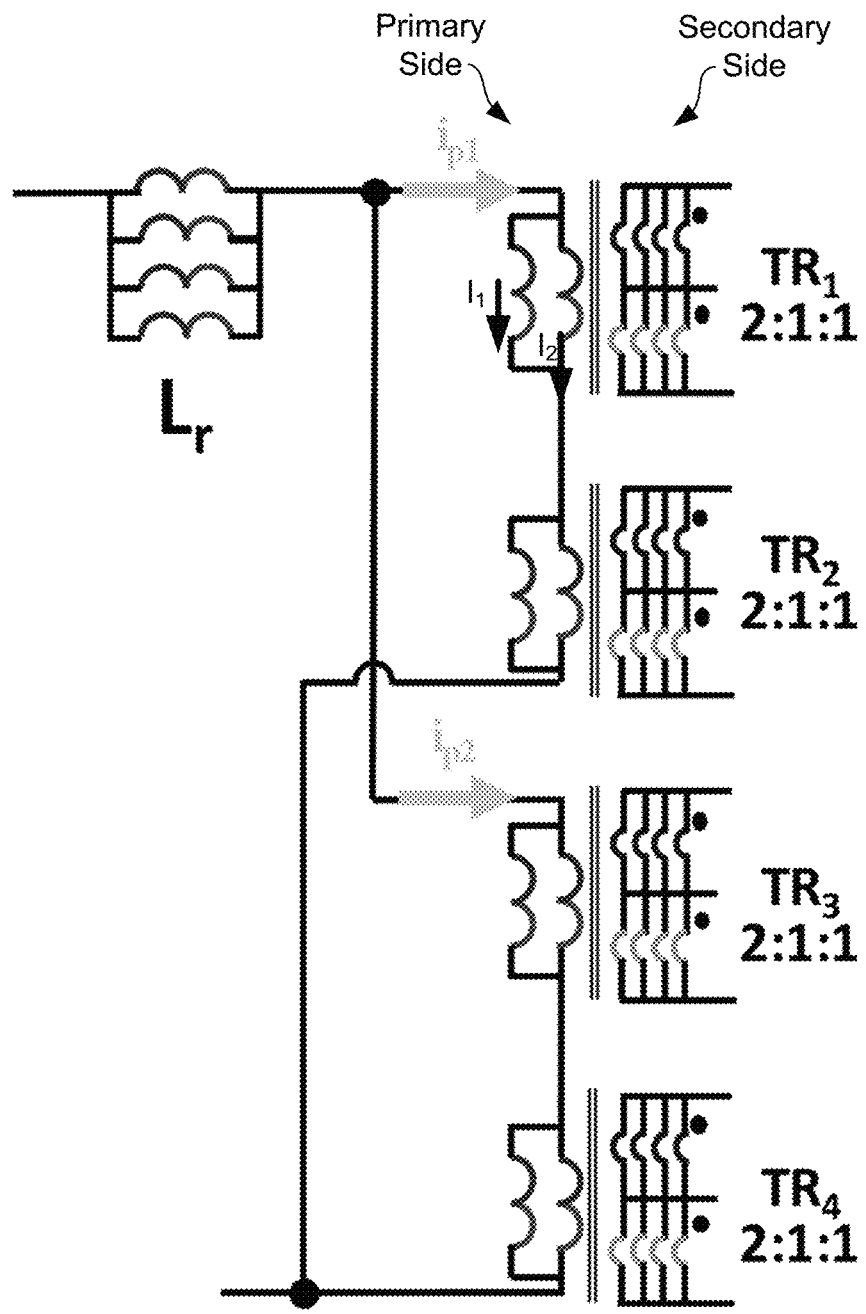
FIG. 11 is an example schematic to illustrate parallel paths to reduce conduction losses according to various embodiments described herein.

For further reduction of the integrated structure conduction losses, parallel connections of primary and secondary windings can be implemented. Shown in FIG. 11 is an example for parallel paths to reduce conduction losses. In this structure, each primary winding has a second parallel path while the secondary windings have 4 parallel paths to reduce the conduction losses. The current sharing between these parallel paths can be implemented to appreciate the benefit of the added PCB layers. In this example, $I_{P1}$ and $I_{P2}$ are further divided equally to $I_1$ and $I_2$.

Figure 12A:
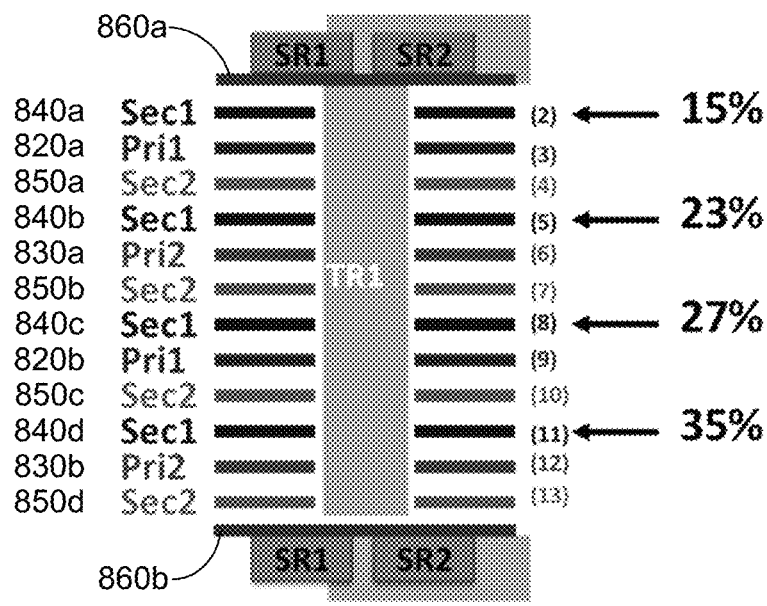
FIGS. 12A and 12B illustrate the planar winding structure showing the cross sectional area of one transformer for the example shown in FIG. 11 according to various embodiments described herein.

FIG. 12A illustrates the planar winding structure showing the cross sectional area of one transformer for the example shown in FIG. 11. With the turns ratio of 2:1:1 and the current $I_1$ and $I_2$ divided for the primary windings, two Pri1 layers 820*a*, 820*b* and two Pri2 layers 830*a*, 830*b* are needed. As shown in FIG. 12A, Pri1 layers 820*a*, 820*b* are placed at layers 3 and 6 and Pri2 layers 830*a*,830*b* are placed at layers 6 and 9. For each primary layer in the winding structure, there are corresponding secondary layers for the first and second half cycle. As such, placed above each primary layer are the secondary windings for the first half cycle, 840*a*-840*d* placed at layers 2, 5, 8, and 11. Placed below each primary layer are the secondary windings for the second half cycle, 850*a*-840*d* at layers 4, 7, 10, and 13. Additionally, a first termination layer 860*a* is place at layer 1 and a second termination layer 860*b* is placed at layer 14. However, the unsymmetrical arrangement shown in FIG. 12A has a non-equal current sharing between the parallel secondary windings. As shown, the current distribution in the first secondary layers is 15% in layer 2, 23% in layer 5, 27% in layer 8, and 35% in layer 11.

Figure 12B:
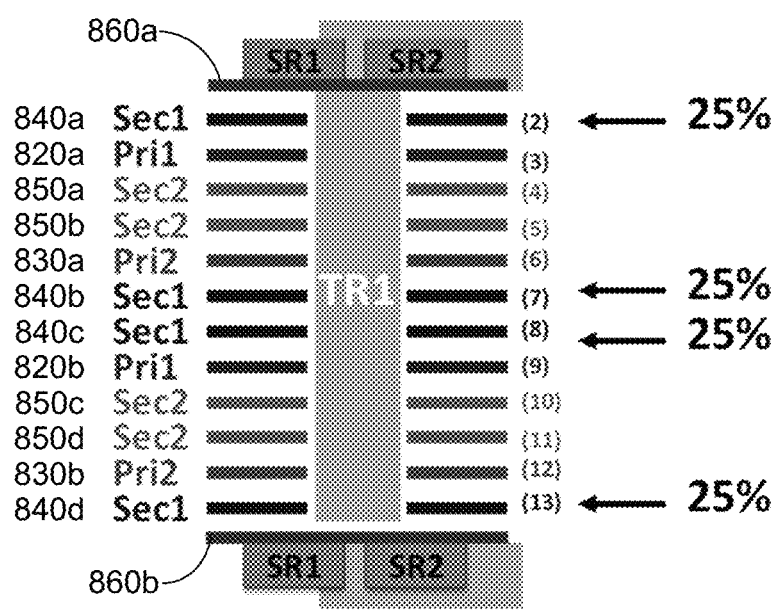

FIG. 12B illustrates the cross sectional area of one transformer showing an alternate symmetrical stack arrangement the planar winding structure. Using the same PCB layers shown in FIG. 12A, the layers are arranged in a symmetrical manner to balance the current between all the secondary windings with equal current sharing to reduce the conduction loss and balance thermal stress. Two turns are connected in series using layers 3 and 6 while the other two turns are connected in series using layers 9 and 12. These two separate series connections are then connected in parallel, represented by $I_1$ and $I_2$ paths, in order to reduce the conduction loss. As shown, the current distribution in the first secondary layers is 25% in layer 2, 25% in layer 5, 25% in layer 8, and 25% in layer 11.

Figure 13:
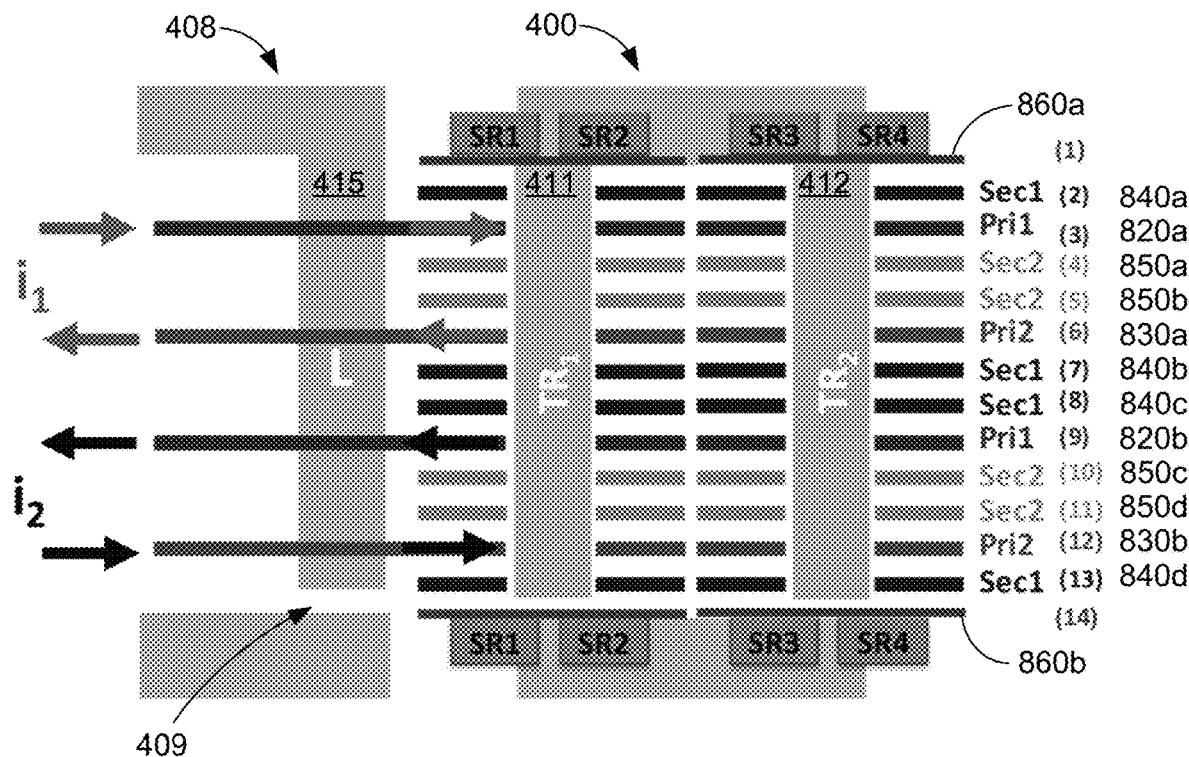
FIG. 13 illustrates an example cross sectional area across a first matrix transformer portion of the integrated parallel matrix transformer and inductor using the core structure with the winding structure shown in FIG. 12B according to various embodiments described herein.

FIG. 13 illustrates an example cross sectional area across a first matrix transformer portion of the integrated parallel matrix transformer and inductor using the separate inductor core 408 and transformer core structure 400 shown in FIG. 6A with the winding structure shown in FIG. 12B. While the separate inductor core 408 and transformer core structure 400 are shown in this example, the single magnetic core 500 can also replace the separate cores. As previously discussed, only the primary layers 820a, 830a, 820b, 830b extend to create an inductor with the inductor pillar 415. The remaining secondary layers are stacked as shown to include a first and second transformer pillar, 411, 412, which are also shown as $TR_1$ and $TR_2$. Referring to FIG. 11, the primary current $I_P$ is first divided to $I_{P1}$ and $I_{P2}$ for the first and second matrix transformers, respectively, then divided again to $I_1$ and $I_2$ over the parallel primary windings. The current flow is shown in FIG. 13 as $I_1$ and $I_2$ for the primary winding in two parallel paths. Current $I_1$ conducts to Pri1 layer 820a at layer 3 and then is connected in series with Pri2 layer 830a at layer 6. Current $I_2$ conducts to Pri2 layer 830b at layer 12 and then is connected in series with Pri1 layer 820b at layer 9. An air gap 409 exists at the bottom of the core structure 408.

Figure 14:
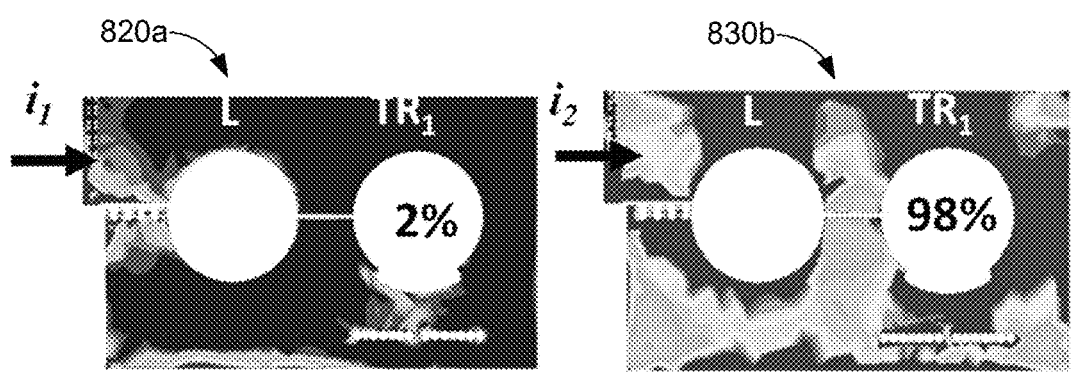
FIG. 14 is an example FEA simulation to illustrate the flux distribution according to various embodiments described herein.

FIG. 14 is an example FEA simulation to illustrate the flux distribution according to various embodiments described herein. Shown in FIG. 14 is a FEA simulation of the flux distribution in layer 3 for current $I_1$ and layer 12 for input current $I_2$ for the winding arrangement shown in FIG. 13 with the range of low to high current flux represented by dark to light shading. For simplicity, one elemental transformer is shown integrated with an inductor. Shown in FIG. 14 is a portion of primary winding layers at the first transformer $TR_1$ pillar 511 and the inductor L pillar 515. The Pri1 820a at layer 3 shown on the left with input current $I_1$ and Pri2 830b at layer 12 shown on the right with input current $I_2$. Due to the integrated core structure of the integrated parallel matrix transformer and inductor, the current sharing in the inductor portion will impact the transformer current sharing in the same manner. A strong fringing flux will always exist in the air gap 409 of the inductor magnetic core which will attract all the current to the nearby layers, which is layer 12 in this example. Pri2 830b at layer 12 represent almost all of the primary side current, while current $I_1$ becomes negligible. This will result in wasting the added primary layers and an increase in the conduction losses as shown in FIG. 14 where layer 3 carries 2% of the total primary current while layer 12 carries 98% of the total primary current. To solve this issue, interconnecting the primary layers can help balance the current.

Figure 15:
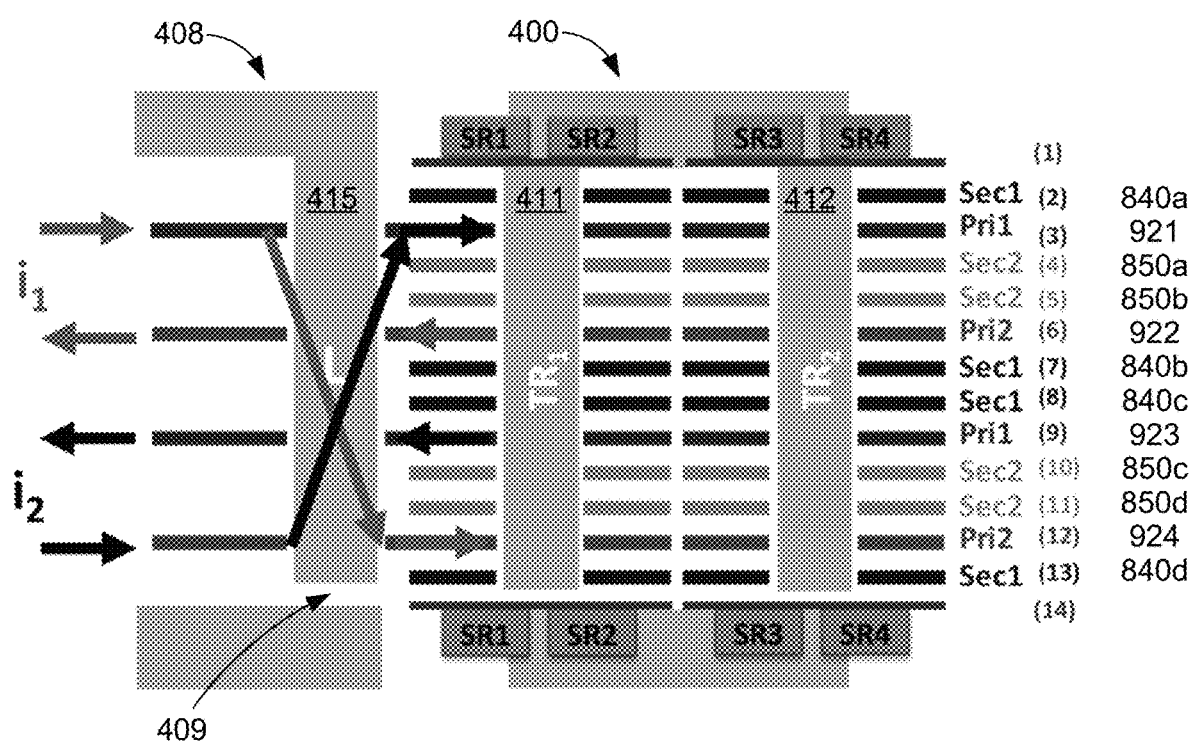
FIG. 15 illustrates an example cross sectional area across a first matrix transformer portion of the integrated parallel matrix transformer and inductor with alternate primary winding PCB layers according to various embodiments described herein.
Figure 16:
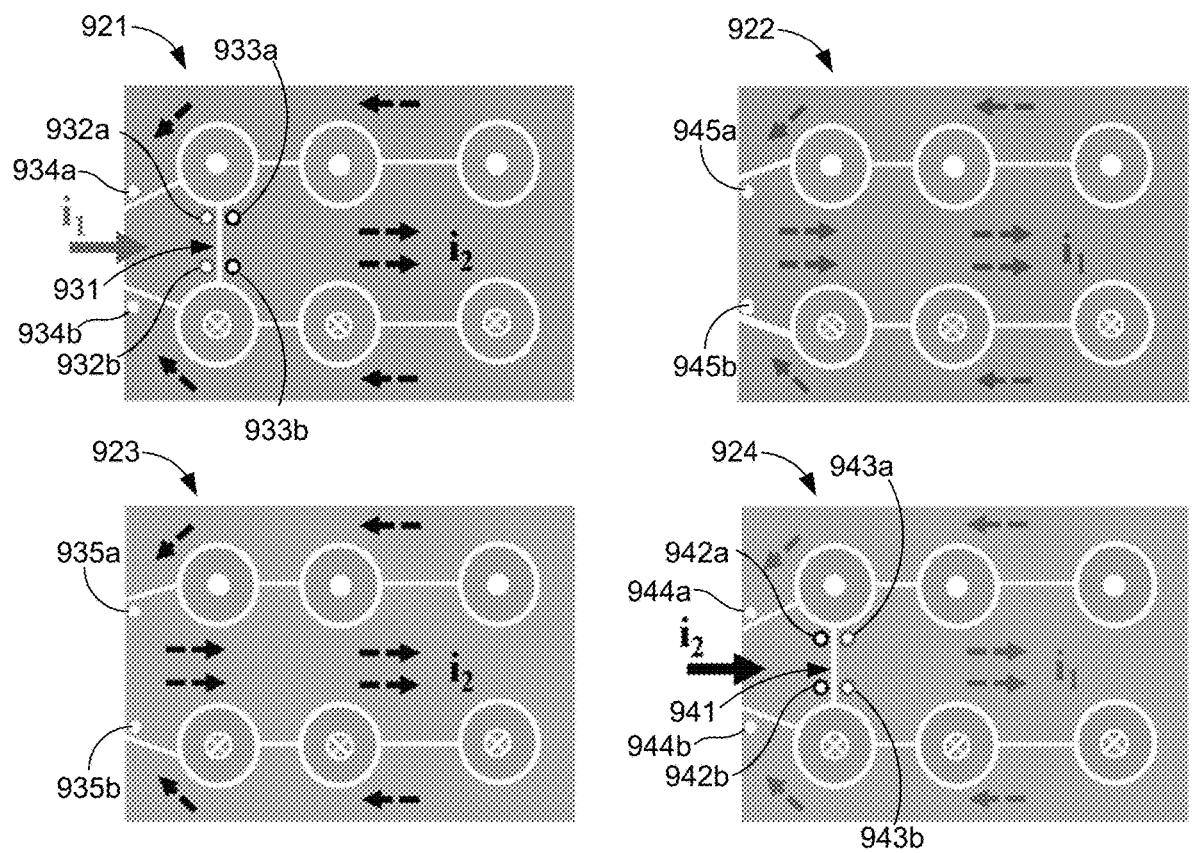
FIG. 16 illustrates the primary winding PCB layers for the interconnection implementation as shown in FIG. 15 according to various embodiments described herein.

FIG. 15 illustrates an example cross sectional area across a first matrix transformer portion of the integrated parallel matrix transformer and inductor with alternate primary winding PCB layers according to various embodiments described herein. As shown in FIG. 15, an example using the inductor core structure 408 and transformer core structure 400 shown in FIG. 6A is shown with the winding structure similar to FIG. 13. In this example, the primary winding PCB layers 820a, 830a, 820b, 830b are replaced with primary PCB layers 921-924 (FIG. 16). An air gap 409 exists at the bottom of the core structure 408. By interconnecting all the primary layers by which the current in each parallel path is conducted close to the strong fringing flux at layer 12 to help balance the current such that $I_1$ becomes equal to $I_2$. This interconnection conducts $I_1$ to enter at layer 3, Pri1 layer 921, then is directed to layer 12, Pri2 layer 924. Similarly, $I_2$ is conducted to enter at layer 12, Pri2 layer 924, then is directed to layer 3, Pri1 layer 921. While the separate inductor core 408 and transformer core structure 400 are shown in this example, similarly the single magnetic core 500 can replace the separate cores with the same winding arrangement.

In this example, current $I_1$ still goes in at layer 3, Pri1 layer 921, but at a position close to the inductor core post there is an interconnection of layer 12, Pri2 layer 924, so that the current $I_1$ will go down through vias to layer 12, Pri2 layer 924, and then connect in series with layer 6, Pri2 layer 922. The current $I_2$ still goes in at layer 12, Pri2 layer 924, but at a position close to the inductor core post there will be an interconnection of layer 12, Pri2 layer 924, so that the current $I_2$ will go up through vias to layer 3, Pri1 layer 921, and then connect in series with layer 9, Pri1 layer 923. This way both $I_1$ and $I_2$ are near the same fringing flux from the inductor core and both of currents will be balanced to utilize the added parallel paths and further reduce the conduction losses.

Figure 17:
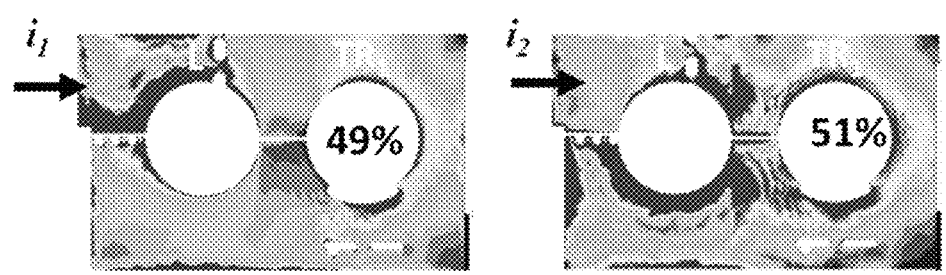
FIG. 17 is an example FEA simulation to illustrate the flux distribution according to various embodiments described herein.

FIG. 16 illustrates the primary winding PCB layers for the interconnection implementation as shown in FIG. 15. The primary winding PCB layers 921-924 are utilized for layers 3, 6, 9, and 12, respectively. To allow interconnection of the primary winding layers, gaps and vias are configured to direct the current. At layer 3, PCB 921 has a gap 931 near the center of the two inductor pillars ($L_1$ and $L_2$). Vias 932a, 932b are placed before the gap 931, with respect to the current flow, such that the current $I_1$ is directed to PCB 924 at layer 12. Vias 932a, 932b are placed after the gap 931 to receive current $I_2$ from PCB 924 at layer 12. Vias 934a, 934b connect to conduct current $I_2$ to PCB 923 at layer 9. PCB 923 has vias 935a, 935b to receive current $I_2$ from PCB 921 at layer 3, which is then conducted by the winding to the output of the transformer. Similarly, at layer 12, PCB 924 has a gap 941 near the center of the two inductor pillars ($L_1$ and $L_2$). Vias 942a, 942b are placed before the gap 941, with respect to the current flow, such that the current $I_2$ is directed to PCB 921 at layer 3. Vias 942a, 942b are placed after the gap 941 to receive current $I_1$ from PCB 921 at layer 3. Vias 944a, 944b connect to conduct current $I_1$ to PCB 922 at layer 6. PCB 922 has vias 945a, 945b to receive current $I_1$ from PCB 924 at layer 12, which is then conducted by the winding to the output of the transformer. This will achieve a perfectly balanced primary winding current. The location of this gap cutting can be in any location alongside the inductor post. The current distribution between the two parallel paths is changed to 49% and 51% with this interconnection as illustrated by the FEA simulation shown in FIG. 17.

While the examples have been illustrated with single and separate cores using 2 pillars for the inductors and 4 pillars for the transformer, the integrated parallel matrix transformer and inductor concepts can be scaled for additional elemental transformers. For example, the transformer core 400 (FIG. 6A) can be extended to include a fifth and sixth transformer ($TR_5$ and $TR_6$) as two additional pillars 417 and 418 adjacent to pillars 412 and 413, respectively, such that the core has 6 transformer pillars (not shown). Similarly, the transformer core 500 (FIG. 6B) can be extended to include a fifth and sixth transformer ($TR_5$ and $TR_6$) as two additional pillars 517 and 518 adjacent to pillars 512 and 513, respectively, such that the transformer portion of the core has 6 transformer pillars (not shown). Similarly, as additional pairs of elemental transformers are added in parallel, pairs of pillars can be added to the transformer core 400 or transformer portion of core 500. For example with two parallel matrix transformers, even though the number of elemental transformers within each of the parallel matrix transformers can increase, only two pillars for inductors are needed, one for each of the parallel matrix transfomers. As such, the separate inductor core 408 or the inductor portion of the single core 500 remain with two pillars. Accordingly, the winding structures described herein can be extended to include the additional pillars for the two additional elemental transformers.

FIGS. 18A-18E illustrate examples of detailed winding arrangements of PCB layers of the winding structure for an integrated parallel matrix transformer and inductor core with two inductor pillars and six transformer pillars. The inductor pillars can be located on a separate core or positioned on the same core as the six transformer pillars (not shown). Similar to the PCB layers shown in FIGS. 10A-10E, the same winding structures can be utilized with the six-transformer core and two pillar inductor core or single core with six transformers and two inductor pillars. For simplicity, the extended elemental transformers in FIGS. 18A-18E are described with respect to an 8-layer PCB winding structure. Accordingly, the winding structures shown herein can be further extended to configurations with eight, ten, or more elemental transformers, increasing in pairs.

Figure 18A:
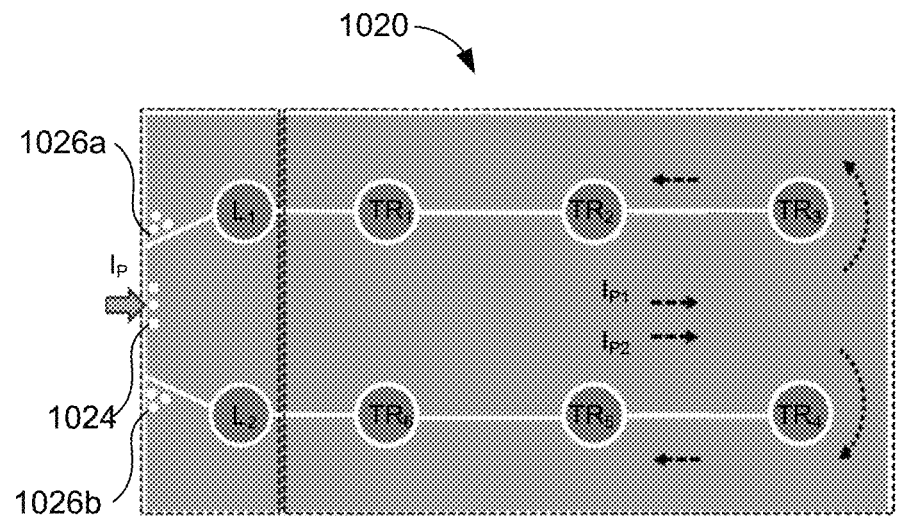
FIGS. 18A-18E illustrate examples of detailed winding arrangements of PCB layers of the winding structure for an integrated parallel matrix transformer and inductor core, where the core shown in FIG. 6B has been extended to include two additional elemental transformers according to various embodiments described herein.
Figure 18B:
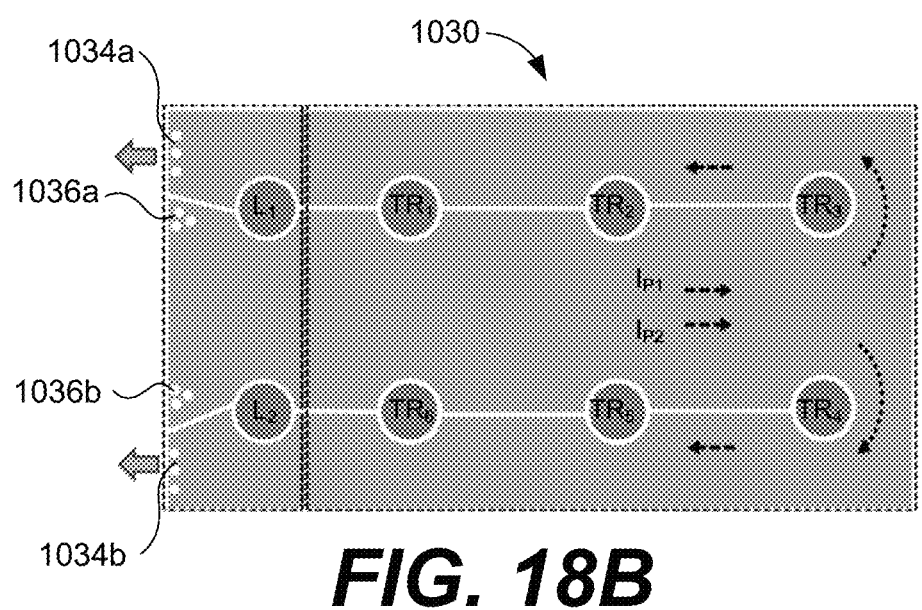

FIGS. 18A and 18B illustrate primary windings for an integrated parallel matrix transformer and inductor core with two inductor pillars and six transformer pillars. Similar to the PCB 820 in FIG. 10A, the primary winding Pri1 layer 1020 is utilized by both the transformer and the inductor. The primary input terminal 1024 conducts the primary current $I_P$. The current is divided equally for the symmetrical primary windings such that $I_{P1}=I_P/2$ conducted around the first set of transformers $TR_1$-$TR_3$ and $I_{P2}=I_P/2$ conducted around the second set of transformers $TR_4$-$TR_6$. The current flows past the inductor pillars $L_1$ and $L_2$ to the vias 1026a and 1026b to connect the first primary winding Pri1 layer 1020 to a second primary winding (Pri2) layer 1030. Similarly, FIG. 18B illustrates a second primary winding Pri2 layer 1030 similar to the Pri2 layer 830 in FIG. 10B. The input current is received from Pri1 layer 1020 through the vias 1036a, 1036b. The symmetrical primary windings conduct current $IP_1$ and $IP_2$. Primary output terminals 1034a and 1034b are used as an exit of the primary current of both the transformer and the inductor. The primary layers 1020 and 1030 can be considered modifications of primary layers 820 and 830, to accommodate the additional pair of transformers. Generally, the primary winding in each primary PCB is configured to equally divide a primary current to conduct half of the primary current around the first inductor pillar and the first set of pillars of the first matrix transformer and to conduct half of the primary current around the second inductor pillar and the second set of pillars of the second matrix transformer.

Figure 18C:
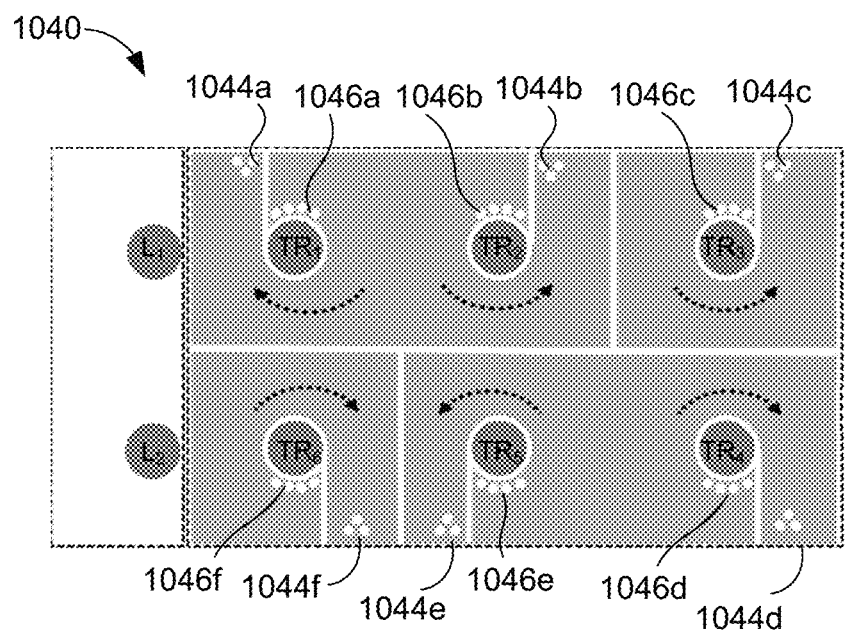
Figure 18D:
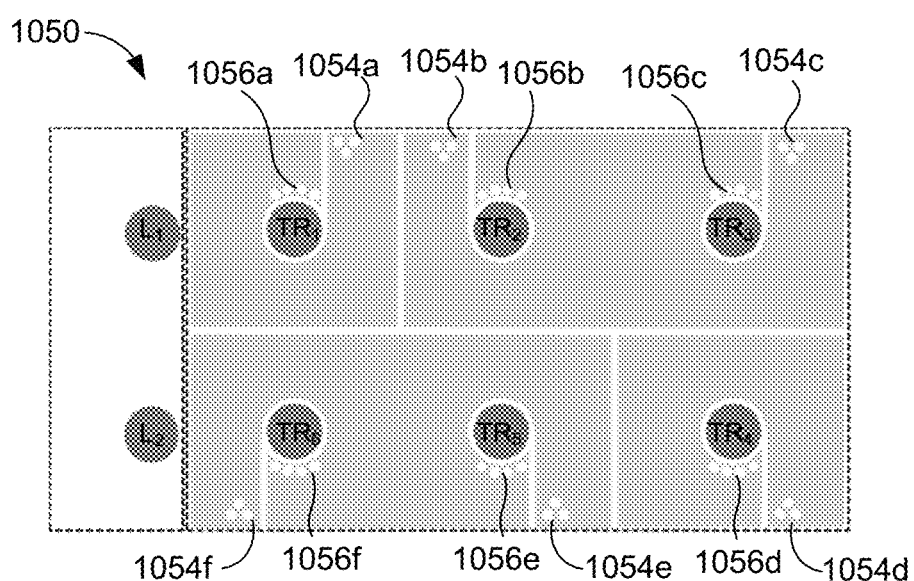

FIGS. 18C and 18D illustrate the secondary windings for the first half cycle (Sec1) layer 1040 (FIG. 18C) and the second half cycle (Sec2) layer 1050 (FIG. 18D). Both the Sec1 layer 1040 and Sec2 layer 1050 are configured to provide secondary windings only in the transformer portion of the integrated parallel matrix transformer and inductor, since only the primary windings are extended to create the inductor. Vias 1044a-f on Sec1 layer 1040 and vias 1054a-f on Sec2 layer 1050 are placed to connect with the termination layer 1060 (FIG. 18E) and other secondary layers. Additionally, terminals 1046a-f on Sec1 layer 1040 and 856a-f on Sec2 layer 1050 provide connection to the termination layer 1060.

As previously discussed with respect to the FEA simulations in FIGS. 9A and 9B, the concept can be extended to reduce current crowding in the gap between the adjacent secondary windings. Overlapping the two secondary windings will result in reduction of the AC winding resistance. For first secondary layer Sec1 1040, gaps are closed between $TR_1$ and $TR_2$ and between $TR_4$ and $TR_5$, as shown in FIG. 18C. For second secondary layer Sec2 1050, gaps are closed between $TR_2$ and $TR_3$ and between $TR_5$ and $TR_6$, as shown in FIG. 18C. Additionally, the PCB layers can be extended to accommodate additional transformers by closing the gaps between the elemental transformers in a staggered manner to overlap the two secondary winding layers. For each primary layer in the winding structure, there are corresponding secondary layers for the first and second half cycle. Accordingly, Sec1 layer 1040 and Sec2 layer 1050 are placed for each primary layer 1020 and 1030.

Figure 18E:
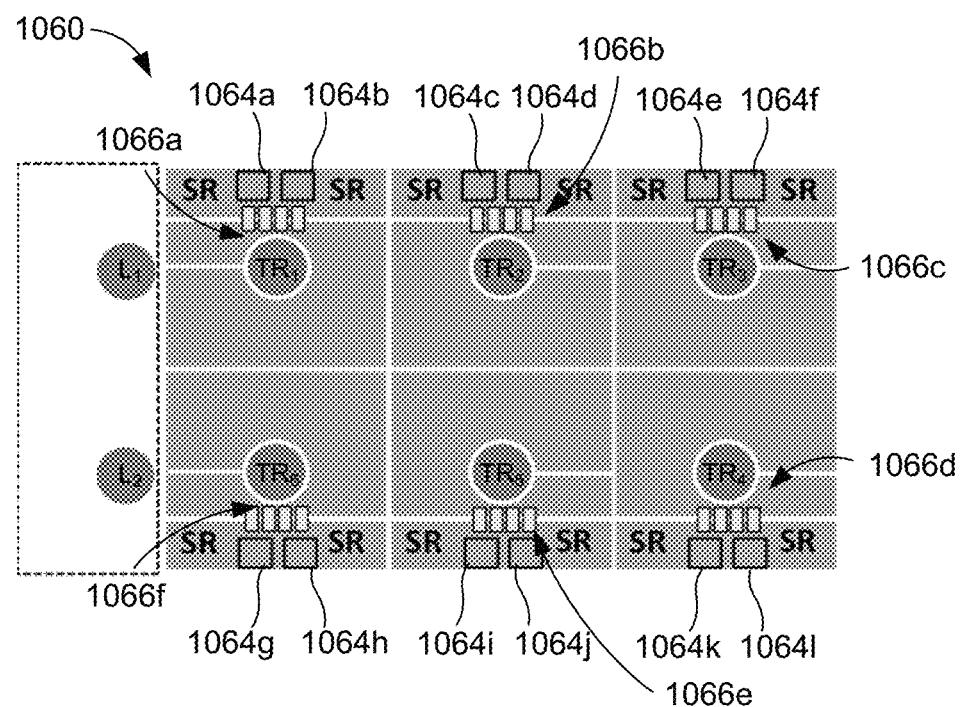

FIG. 18E illustrates a termination layer 1060 having components windings for placement of the synchronous rectifiers (SR) 1064a-l and output capacitors 1066a-f very close to the windings to reduce termination losses. The termination layer is in communication with the secondary winding layers connected by vias 1044a-f on Sec1 layer 1040 and vias 1054a-d on Sec2 layer 1050. The PCB layers shown in FIGS. 18A-18E can be utilized in a similar manner as the PCB layers shown in FIGS. 10A-10E and modified accordingly. For example, in an 8 layer planar winding structure, two termination layers 1060a, 1060b are positioned at the top and the bottom, Pri1 layer 1020 is positioned at layer 3, Pri2 layer 1030 is positioned at layer 6, Sec1 layers 1040a, 1040b are positioned at layers 2 and 5, and Sec2 layers 1050a, 1050b are positioned at layers 4 and 7. It can be understood, that PCB layers 1020, 1030, 1040, 1050, and 1060 with a 6 transformer configuration can be ordered in the configurations described with respect to PCB layers 820, 830, 840, 850, and 860. Similarly, the PCB layers can be extended to accommodate additional transformers.

Additionally, primary layers 1020 and 1030 can be modified or replaced to allow interconnecting of the primary layers to balance the current as shown in FIG. 15. The position of gaps and vias would be positioned in the same manner as shown in FIG. 16. For example, the primary PCB layers 921-924 (FIG. 16) can be modified to include a fifth and sixth transformer such that the windings include a first set of transformer pillars and an inductor pillar for the first matrix transformer and a second set of transformer pillars and an inductor pillar for the second matrix transformer.

Described herein is a novel parallel matrix transformer structure integrated with an inductor for the DC/DC converter using a single 1-core structure or using separate 2-core structures. A transformer structure is provided which integrates 2 parallel transformers into 1 magnetic core. By integrating the inductor and transformers with the same winding structure total winding length and losses are reduced. The integrated inductor with transformer can be in the same core or separate core structures. Winding can be implemented by multi-layer PCB. Synchronous rectifiers and output capacitors can be placed very close to the winding on separate layers. The winding structure that minimizes the winding length of the primary winding is used by the transformer and the inductor. The windings are arranged in such a way that the copper is overlapped in parts of secondary windings to reduce the AC resistance of the transformer. Further, the winding loop of the primary terminals is minimized so as the leakage inductance of the terminals. A symmetrical winding structure of the primary windings provides equal current sharing between the two parallel transformers. An example arrangement of PCB layers is shown for balancing current between paralleled secondary winding layers. An example of interconnection of parallel primary winding layers is shown to achieve equal current sharing and reduce conduction losses.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A transformer, comprising:
   a first magnetic core comprising a plurality of pillars extending from a first planar core base, the plurality of pillars comprising a first set of pillars of a first matrix transformer, the first set of pillars arranged linearly and in parallel with a second set of pillars of a second matrix transformer, where the second set of pillars are arranged linearly;
   a second magnetic core comprising first and second inductor pillar extending from a second planar core base, the second magnetic core positioned adjacent to the first magnetic core such that the first inductor pillar is aligned with the first set of pillars of the first transformer, the second inductor pillar is aligned with the second set of pillars of the second transformer; and
   a planar winding structure comprising a primary winding and a plurality of secondary windings, the primary winding having two parallel paths in a primary layer of the planar winding structure, the two parallel paths comprising symmetrical first and second paths suitable to equally divide a primary current along the two parallel paths, the primary winding suitable to create a controlled value inductance extending along a first path encircling the first inductor pillar and the first set of pillars of the first transformer and a second path encircling the second inductor pillar and the second set of pillars of the second transformer.

2. The transformer of claim 1, wherein the planar winding structure further comprises a number of primary layers equal to a number of turns of the primary winding.

3. The transformer of claim 2, wherein the primary layers are connected by vias configured to conduct current between layers.

4. The transformer of claim 1, wherein:
   the planar winding structure further comprises a number of first secondary layers equal to a number of primary layers, and a number of second secondary layers equal to the number of the primary layers; and
   the windings of the first and second secondary layers extend around individual pillars of the first magnetic core.

5. The transformer of claim 1, wherein:
   the planar winding structure further comprises a number of first secondary layers equal to a number of primary layers, and a number of second secondary layers equal to the number of the primary layers;
   the secondary windings of the first secondary layer extend around the first set of pillars and gaps between each of the pillars of the second set of pillars; and
   the second secondary layer extend around the second set of pillars and gaps between each of the pillars of the first set of pillars.

6. The transformer of claim 4, wherein the planar winding structure further comprises a pair of termination layers and the first and second secondary layers comprise vias, the vias are configured to connect said first and second secondary layers and the pair of termination layers.

7. The transformer of claim 1, wherein the planar winding structure further comprises a pair of termination layers comprising synchronous rectifiers and output capacitors.

8. The transformer of claim 1, wherein the primary and plurality of secondary windings are arranged in such a way that copper of secondary layers is overlapped in parts of the plurality of secondary windings.

9. The transformer of claim 1, wherein the first and second magnetic cores are integrated into a singular unitary structure thereby forming integrated transformer and inductor cores.

10. The transformer of claim 1, wherein the planar winding structure further comprises a number of primary layers equal to twice a number of turns of the primary winding, the primary winding further configured to equally divide current of the first and second paths such that current input is received on two separate primary layers.

11. A transformer, comprising:
    a first magnetic core comprising a first planar core base and a plurality of pillars, the plurality of pillars comprising a first set of pillars of a first matrix transformer arranged linearly and extending from the first planar core base and a second set of pillars of a second matrix transformer arranged linearly and extending from the first planar core base, the first set of pillars arranged in parallel with the second set of pillars;
    a second magnetic core comprising a second planar core base, a first inductor pillar, and a second inductor pillar, the first and second inductor pillars extending from the second planar core base, the second magnetic core positioned adjacent to the first magnetic core such that the first inductor pillar and the first set of pillars of the first transformer are aligned, the second inductor pillar and the second set of pillars of the second transformer are aligned; and
    a planar winding structure comprising at least one primary layer comprising a primary winding, at least two secondary layers comprising a plurality of secondary windings, and a pair of termination layers, the primary winding having two parallel paths in the at least one primary layer of the planar winding structure, the two parallel paths comprising symmetrical first and second paths suitable to equally divide a primary current along the two parallel paths, the primary winding suitable to create a controlled value inductance extending along a first path encircling the first inductor pillar and the first set of pillars of the first matrix transformer and along a second path encircling the second inductor pillar and the second set of pillars of the second matrix transformer.

12. The transformer of claim 11, wherein the primary winding is configured in parallel to equally divide an input current to a first current and a second current, the first current conducted over a first primary winding with a number of turns and a second current conducted over a second primary winding with the number of turns.

13. The transformer of claim 11, wherein the primary winding comprises four primary layers, the primary winding configured to conduct a first current over first and second primary layer connected by vias, the primary winding configured to conduct a second current over third and fourth primary layers connected by vias.

14. The transformer of claim 11, wherein the primary winding comprises parallel primary winding layers interconnected to achieve equal current sharing and reduce conduction losses.

15. The transformer of claim 11, wherein:
the primary winding comprises four primary layers interconnected for current sharing;
a first primary layer comprises an input for a first current, vias to conduct the first current to a fourth primary layer, vias to receive a second current from the fourth primary layer, and vias conduct the second current to a third primary layer;
a second primary layer comprising vias to receive the first current from the fourth primary layer and an output for the first current;
the third primary layer comprising vias to receive the second current from the third primary layer and an output for the second current; and
the fourth primary layer comprises an input for the second current, vias to conduct the second current to the first primary layer, vias to receive the first current from first primary layer, and vias to conduct the first current to the second primary layer.

16. The transformer of claim 15, wherein the planar winding structure further comprises four first secondary layers and four second secondary layers that comprise the plurality of secondary windings, the first and second secondary layers positioned for each of the four primary layers in a symmetrical arrangement.

17. The transformer of claim 11, wherein the planar winding structure further comprises a pair of termination layers comprising synchronous rectifiers and output capacitors.

18. The transformer of claim 11, wherein the planar winding structure further comprises a number of first secondary layers equal to a number of primary layers and a number of second secondary layers equal to the number of primary layers, the first and second secondary layers comprising vias to connect the first and second secondary layers and a pair of termination layers.

19. The transformer of claim 18, wherein each of the first secondary layers has an overlapping portion of the secondary windings for the first set of pillars and each of the second secondary layers has an overlapping portion of the secondary windings for the second set of pillars.

20. The transformer of claim 11, wherein the first and second magnetic cores are integrated into a singular unitary structure thereby forming integrated transformer and inductor cores.

* * * * *